(12) United States Patent
Autrey

(10) Patent No.: US 11,826,840 B1
(45) Date of Patent: Nov. 28, 2023

(54) SCROLL SAW WITH MOVABLE ARM

(71) Applicant: Ronald Dennis Autrey, Attalla, AL (US)

(72) Inventor: Ronald Dennis Autrey, Attalla, AL (US)

(*) Notice: Subject to any disclaimer, the term of this patent is extended or adjusted under 35 U.S.C. 154(b) by 0 days.

(21) Appl. No.: 18/124,013

(22) Filed: Mar. 21, 2023

Related U.S. Application Data

(60) Provisional application No. 63/474,131, filed on Jul. 21, 2022.

(51) Int. Cl.
| | |
|---|---|
| *B23D 51/14* | (2006.01) |
| *B23D 51/02* | (2006.01) |
| *B23D 49/00* | (2006.01) |
| *B23D 51/12* | (2006.01) |

(52) U.S. Cl.
CPC ........... *B23D 51/14* (2013.01); *B23D 49/007* (2013.01); *B23D 51/02* (2013.01); *B23D 51/125* (2013.01)

(58) Field of Classification Search
CPC ................ B23D 49/007–167; B23D 51/14
See application file for complete search history.

(56) References Cited

U.S. PATENT DOCUMENTS

| | | | | |
|---|---|---|---|---|
| 2,780,249 A | * | 2/1957 | Maynard | B23D 49/007 83/781 |
| 3,570,351 A | * | 3/1971 | Spengler | B23Q 1/5406 83/427 |
| 4,455,909 A | * | 6/1984 | Wilbs | B23D 51/20 83/777 |
| 4,616,541 A | * | 10/1986 | Eccardt | B23D 49/007 83/662 |
| 5,018,420 A | * | 5/1991 | Plomb | B23D 51/20 83/785 |
| 5,058,476 A | * | 10/1991 | Legler | B23D 51/14 83/581.1 |
| 5,228,376 A | * | 7/1993 | Huang | B23D 51/02 83/781 |
| 5,235,890 A | * | 8/1993 | Mathre | B23D 49/007 83/545 |
| 5,778,752 A | * | 7/1998 | Chen | B23D 49/007 83/581 |
| 6,012,373 A | * | 1/2000 | Brickner, Jr. | B23D 51/14 83/859 |
| 6,267,038 B1 | * | 7/2001 | O'Banion | B23D 49/007 83/781 |
| 6,363,822 B2 | * | 4/2002 | Lei | B23D 59/001 83/DIG. 1 |
| 6,550,365 B1 | * | 4/2003 | Zhang | B23D 49/007 83/785 |

(Continued)

*Primary Examiner* — Sean M Michalski
(74) *Attorney, Agent, or Firm* — George L Williamson

(57) ABSTRACT

Method and apparatus for a scroll saw having a base along with an upright hollow frame with a work table attached to the lower frame used to support a workpiece to be cut. The scroll saw includes upper and lower pivotable arms driven by a motor with a saw blade between the pivotable arms. A rotatable member is included in the upright frame member for rotating an upper frame assembly in a horizontal plane. The front portion of the work table can be removed from the scroll saw to access the saw blade and the work table can be automatically leveled. Also the saw blade travels in a true vertical motion and it remains centered during operation to prevent it from creeping forward during operation.

18 Claims, 20 Drawing Sheets

(56) References Cited

U.S. PATENT DOCUMENTS

| | | | | |
|---|---|---|---|---|
| 6,619,174 | B1* | 9/2003 | Chiang | B23D 51/14 |
| | | | | 83/581.1 |
| 6,729,221 | B2* | 5/2004 | Liao | B23D 49/007 |
| | | | | 83/781 |
| 6,854,373 | B1* | 2/2005 | Barkhurst | B23D 51/14 |
| | | | | 83/581.1 |
| 8,499,674 | B2* | 8/2013 | Holba | B27B 19/006 |
| | | | | 83/746 |
| 9,067,267 | B2* | 6/2015 | Brown | B23D 51/08 |
| 2002/0112582 | A1* | 8/2002 | Young | B23Q 11/0053 |
| | | | | 83/167 |
| 2009/0025527 | A1* | 1/2009 | Chen | B23D 51/16 |
| | | | | 83/783 |
| 2012/0132050 | A1* | 5/2012 | Brown | B26D 7/2614 |
| | | | | 83/781 |
| 2019/0224765 | A1* | 7/2019 | Wang | B27B 3/12 |

* cited by examiner

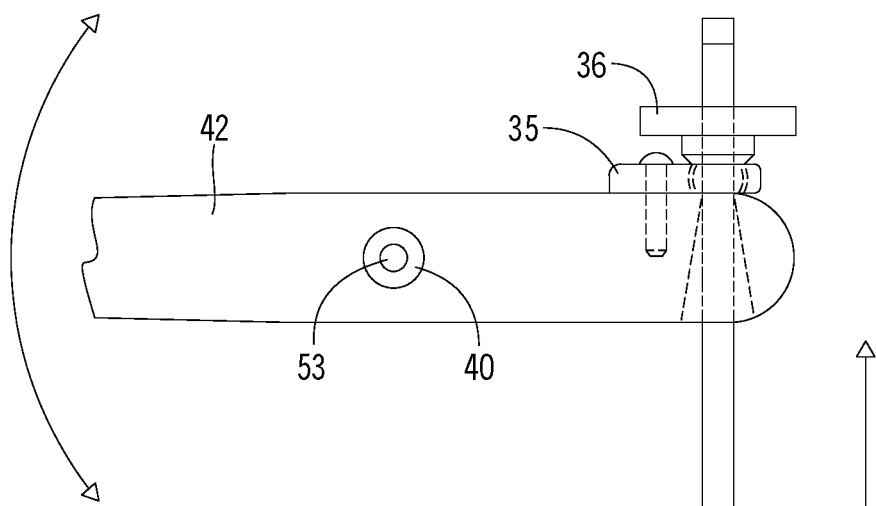
FIG. 22
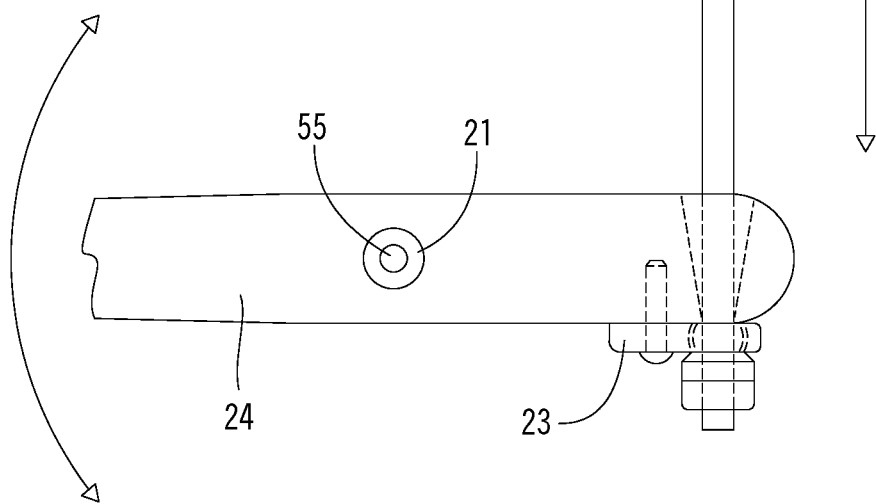

SCROLL SAW WITH MOVABLE ARM

CROSS REFERENCE TO RELATED APPLICATIONS

This application claims benefit to U.S. Provisional Patent Application having Ser. No. 63/474,131 filed on Jul. 21, 2022.

BACKGROUND OF THE INVENTION

Field of the Invention

The present invention relates generally to scroll saws and, more particularly, is concerned with a scroll saw having a pivotable arm.

The present invention is a member of the family of sawing tools, specifically the walking beam scroll saws. This particular scroll saw is designed to incorporate several improvements over the current art and with the purpose of making this scroll saw much easier to use and therefore much more productive.

The first modern scroll saw was probably invented about two hundred years ago.

The records show that a Mr. M'Duff was issued a patent for a scroll saw in 1829 in England. The first scroll saws were called 'Fretsaws'. The coping saws were probably the forerunner to the modern scroll saw. Before the scroll saw existed, there was much fretwork made in the 1500's and 1600's.

The scroll saw has changed little since Mr. M'Duff invented his. The modern scroll saw has many design flaws that prevent the scroll saw from operating at its full potential. The present invention is designed to solve many of these problems.

Description of the Related Art

Methods for pivoting an arm of a scroll saw have been described in the related art, however, none of the related art devices disclose the unique features of the present invention.

U.S. Pat. No. 5,058,476, dated Oct. 22, 1991 to Legler et al., discloses an invention for a scroll saw having pivoting arms but it differs from the present invention in that the means for pivoting the arms is structurally different from the present invention and its arms are pivoted in the vertical plane whereas the arms of the present invention pivot in the horizontal plane.

While these methods for scroll saws may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a scroll saw having a base along with an upright hollow frame with a work table attached to the lower frame used to support a workpiece to be cut. The scroll saw includes upper and lower pivotable arms driven by a motor with a saw blade between the pivotable arms. A rotatable member is included in the upright frame member for rotating an upper frame assembly in a horizontal plane. The front portion of the work table can be removed from the scroll saw to access the saw blade and the work table can be automatically leveled. Also the saw blade travels in a true vertical motion and it remains centered during operation to prevent it from creeping forward during operation.

It is an objective of the present invention to provide a scroll saw designed to aid in solving the problem of workpiece chatter by changing the original design and putting pivotable 'links' at the upper and lower ends of the scroll saw blade carriers. This addresses an inherent problem with this original scroll saw design. The forward ends of the pivotable scroll saw arm design travels on a radial path as they move vertically up and down. This radial motion carries the scroll saw blade on the same radial path and the blade moves forward and backward as it travels up and down causing workpiece chatter.

It is a further objective of the present invention to help solve the problem of changing the scroll saw blade from one cutting position to the next by providing a pivotable or movable arm. This addresses the problem with scroll saws that the arms are generally immovable. Most scroll saws use a variety of scroll saw blades that are approximately five inches in length. Once the scroll saw blade is installed on the scroll saw between the upper and lower pivotable arms, there is approximately two inches (2") clearance between the work table surface and the lower end of the upper blade clamp when the upper pivotable arm is at the bottom of its down-stroke. This presents a challenge for the scroll saw operator. One of the most important features of every scroll saw is the ability of the saw to make 'inside' cuts to the workpiece. To accomplish an inside cut with a scroll saw, and an appropriate size hole must be drilled through the workpiece inside the area to be cut. To install a workpiece on the scroll saw table for an inside cut, first, the upper end of the scroll saw blade must be detached from the upper blade carrier, then inserted and threaded through the pre-drilled hole in the workpiece. The upper end of the scroll saw blade must then be reattached to the upper blade carrier. Since there is only about two inches (2") of clearance between the work table surface and the lower end of the upper blade clamp, this often presents a problem for the scroll saw operator when the operator attempts to thread the thin saw blade through the pre-drilled hole in the workpiece. There is zero clearance between the upper end of the detached scroll saw blade and the lower end of the upper blade clamp. To insert the scroll saw blade through the pre-drilled hole in the workpiece, the scroll saw operator must bend the upper part of the detached scroll saw blade forward, then maneuver the workpiece and the detached end of the scroll saw blade into a position that will allow the operator to insert the detached end of the scroll saw blade into and through the pre-drilled hole in the workpiece. This situation severely limits the thickness of the workpiece that can be inserted and cut in the scroll saw. The only alternative, especially for thick workpieces, is for the scroll saw operator to detach both the upper and lower ends of the scroll saw blade from their respective blade carriers. Then the scroll saw operator must insert the scroll saw bade through the pre-drilled hole in the workpiece, slide the workpiece into place on the work table, then reattach the upper and lower ends of the scroll saw blade to their respective blade carriers with the scroll saw blade inserted through the pre-drilled hole in the workpiece. This maneuver is usually very difficult to accomplish because most modern scroll saws have very little extra space beneath the worktables, especially in the area of the scroll saw blade. This process is time consuming and can be very frustrating to the operator.

It is a further objective of the present invention to provide a much more accurate and efficient method of securing the scroll saw work table into its proper level position by providing a work table leveling feature. This addresses the problem that most modern scroll saws have work tables that can be rotated radially to either side by as much as 45 degrees, as viewed from the position of the operator, in order to facilitate angle cuts in the workpiece. After the desired angle cuts are completed, the scroll saw operator must use some method to return the scroll saw work table to its level position of 90 degrees exactly perpendicular to the vertical alignment of the scroll saw blade. The most common method is the placement of a compass device mounted under and near the front of the work table with a 'pointer' mounted to the lower frame. These devices are seldom accurate enough for precision work and the scroll saw operator must use a squaring device to check the work table angle relative to the position of the scroll saw blade. This method of leveling the scroll saw work table is time-consuming and is often frustrating for the scroll saw operator.

It is a further objective of the present invention to provide a scroll saw which allows the front of the work table to be removed thereby providing better access. This addresses a problem with the design of most modern scroll saws that allows for very little extra space beneath the scroll saw work tables, especially in the area of the scroll saw blades and blade carriers. Because of the space restrictions, changing the scroll saw blades or doing maintenance and adjustments to the mechanisms beneath the scroll saw work tables is often difficult and time-consuming.

It is a further objective of the present invention to provide a solution for the problem of poorly designed scroll saw blade clamps by providing an improved blade clamp. This addresses a problem in the design of scroll saw blade clamps which are as varied as the number of different types of scroll saws in existence today. Many modern scroll saws are equipped with blade clamps that are of poor design and results in the scroll saw operator having difficulty installing or changing blades. The situation is often time-consuming and frustrating for the scroll saw operator.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 22 is a side view of portions of the upper and lower pivotable arms of the present invention.

LIST OF REFERENCE NUMERALS

Figure 1:
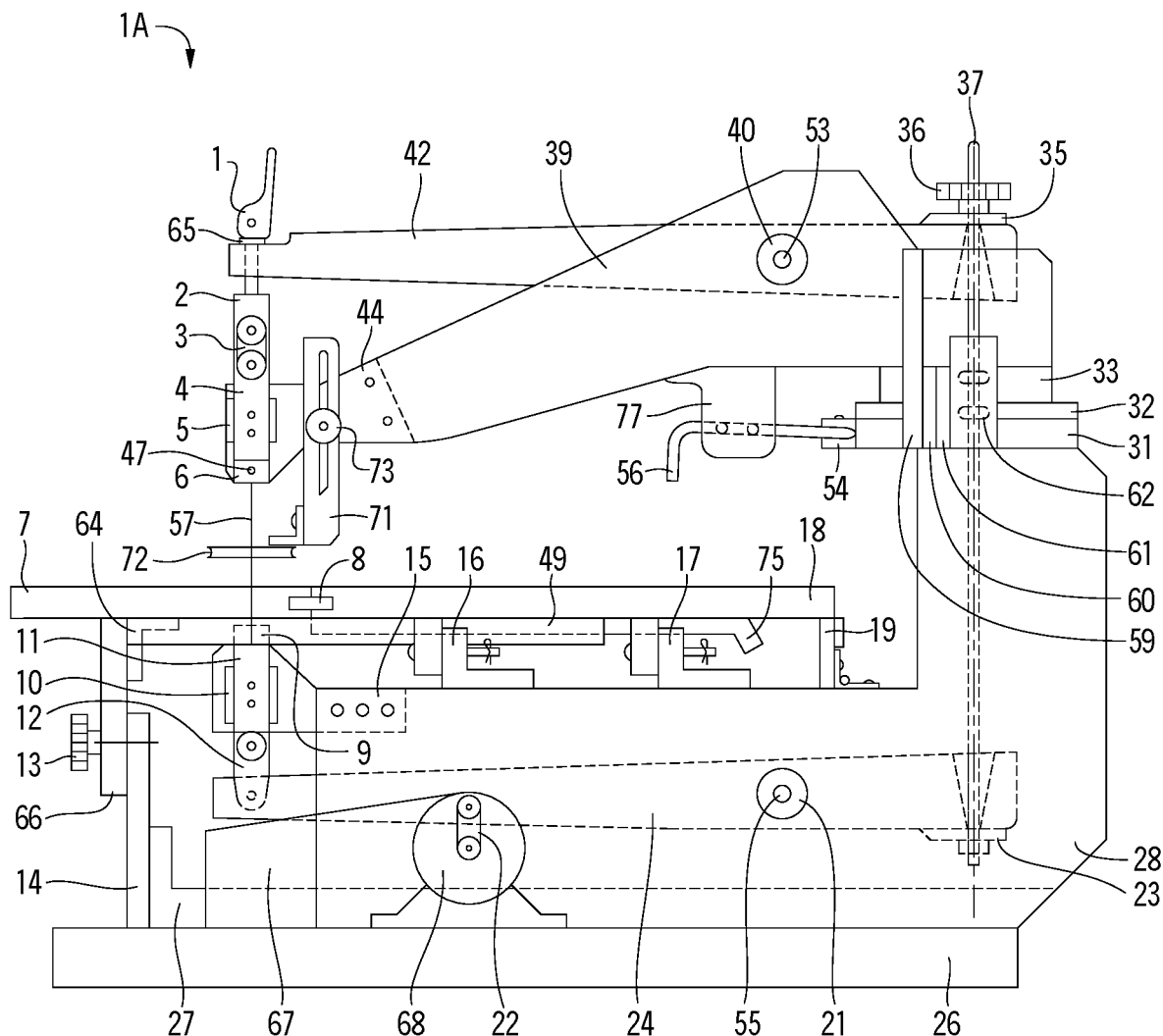
FIG. 1 is a right side elevation view of the present invention.

With regard to reference numerals used, the following numbering is used throughout the drawings.

1 Adjustable saw blade tension device
1A present invention
2 saw blade adjustment block
3 upper link that connects saw blade adjustment block 2 to the upper blade carrier 4
4 upper blade carrier
5 upper linear bearing
6 upper blade clamp
7 removable front table section
8 dowel pins to align removable front table section 7 with rear table section 18
9 lower blade clamp
10 lower linear bearing
11 lower blade carrier
12 lower link that connects the lower pivotable arm 24 to the scroll saw blade 57
13 front table adjustment knob
14 upright bracket that connects to the slotted tiltable table bracket 66
15 lower front mounting plate for the scroll saw blade slide assembly
16 front table swivel 17 rear table swivel
18 rear table section
19 quick table leveling device
20 frame spacer
21 lower shaft bearing
22 motor connector to connect the variable speed motor 68 to the lower stroke arm 24
23 lower ball joint
24 lower pivotable arm
25 frame spacer
26 scroll saw base
27 lower frame spacer/lower frame mounting beam for attaching the sides of the scroll saw
28 stationary lower frame section below the attachment point of the upper swing arm section 39
29 frame spacer
30 frame spacer
31 mount for the outer ring of the turntable bearing that connects to the lower frame section 28
32 turntable swivel bearing for the upper frame arm section 39 to allow the upper frame arm to rotate to the side and clear of the table
33 mount for the inner ring of the turntable bearing that connects to the upper frame arm section
34 frame spacer
35 upper ball joint
36 rear blade tension adjusting knob
37 threaded connecting rod for connecting the rear of the pivotable arms
38 frame spacer
39 upper frame/swing arm assembly
40 upper shaft bearing
41 frame spacer
42 upper pivotable arm
43 frame spacer
44 upper front mounting plate for the scroll saw blade slide assembly
45 upper linear bearing slide
46 lower linear bearing slide
47 upper blade clamp thumb screw
48 lower blade clamp thumb screw
49 support arms for the front removable table section 7
50 lower linear bearing spacer to center the blade 57
51 upper linear bearing spacer to center the blade 57
52 deleted
53 upper bearing shaft for the upper pivotable arm
54 double roller assembly for upper arm locking/unlocking device
55 lower bearing shaft for lower pivotable arm
56 upper frame arm locking/unlocking device
57 scroll saw blade
58 blade tension adjusting screw
59 upper mounting bracket for metal plate attracted by the magnet to hold arm closed until upper arm locking/unlocking device can be engaged
60 metal plate used with magnet to keep upper arm in place until upper arm locking/unlocking device can be engaged
61 magnet used as an adjustable upper arm stop and to attract metal plate 60 to keep upper arm in place until the upper frame arm locking/unlocking device can be engaged
62 magnet assembly mounting plate
63 angle bracket to mount adjustable magnet mount
64 mounting bracket to connect the front removable table section to the slotted table tilting bracket 66
65 hardened washer
66 slotted table bracket to allow scroll saw table to tilt up to 45 degrees either left or right
67 scroll saw variable speed motor controller
68 variable speed scroll saw motor that connects to and drives the lower pivotable arm
69 upper arm pivot point
70 lower arm pivot point
71 work hold-down vertical adjustable slide
72 work hold-down device radially adjustable to follow the saw table when the scroll saw is cutting a work piece on an angle
73 work hold-down slide knob
74 dust removal channel to carny saw dust to a vacuum system
75 vacuum nozzle attachment
76 tapered nuts against ball joints
77 mounting bracket for upper arm latch

DETAILED DESCRIPTION OF THE PREFERRED EMBODIMENT(S)

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1-23 illustrate the present invention wherein a scroll saw having a pivotable arm is disclosed and which is generally designated by reference numeral 1A.

Turning to FIG. 1, shown therein is a view of the right side of the scroll saw 1A as viewed from the position of the operator. The scroll saw of the present invention 1A includes a base 26, an upright stationary lower frame section 28 mounted on the base 26, a work table 7 attached to the lower frame 28 which is used to support the workpiece to be cut, two pivotable arms 24, 42 with one being a lower pivotable arm 24 and the other being an upper pivotable arm 42, wherein one 42 is located above and the other 24 located below the work table 7. The forward ends of the pivotable arms 24, 42, as viewed from the position of the scroll saw operator, includes upper and lower blade clamps 6, 9 each of which holds an end of the saw blade 57 securely in a vertical alignment position between the forward ends of the upper 42 and lower 24 pivotable arms. A rotating energy or power source in the form of a variable speed motor 68 connects to and drives the two pivotable scroll saw arms 24, 42 to reciprocate up and down in a vertical plane carrying the scroll saw blade 57 up and down a short distance at varying speeds, allowing the scroll saw of the present invention 1A to cut a workpiece into the desired shape.

Figure 2:
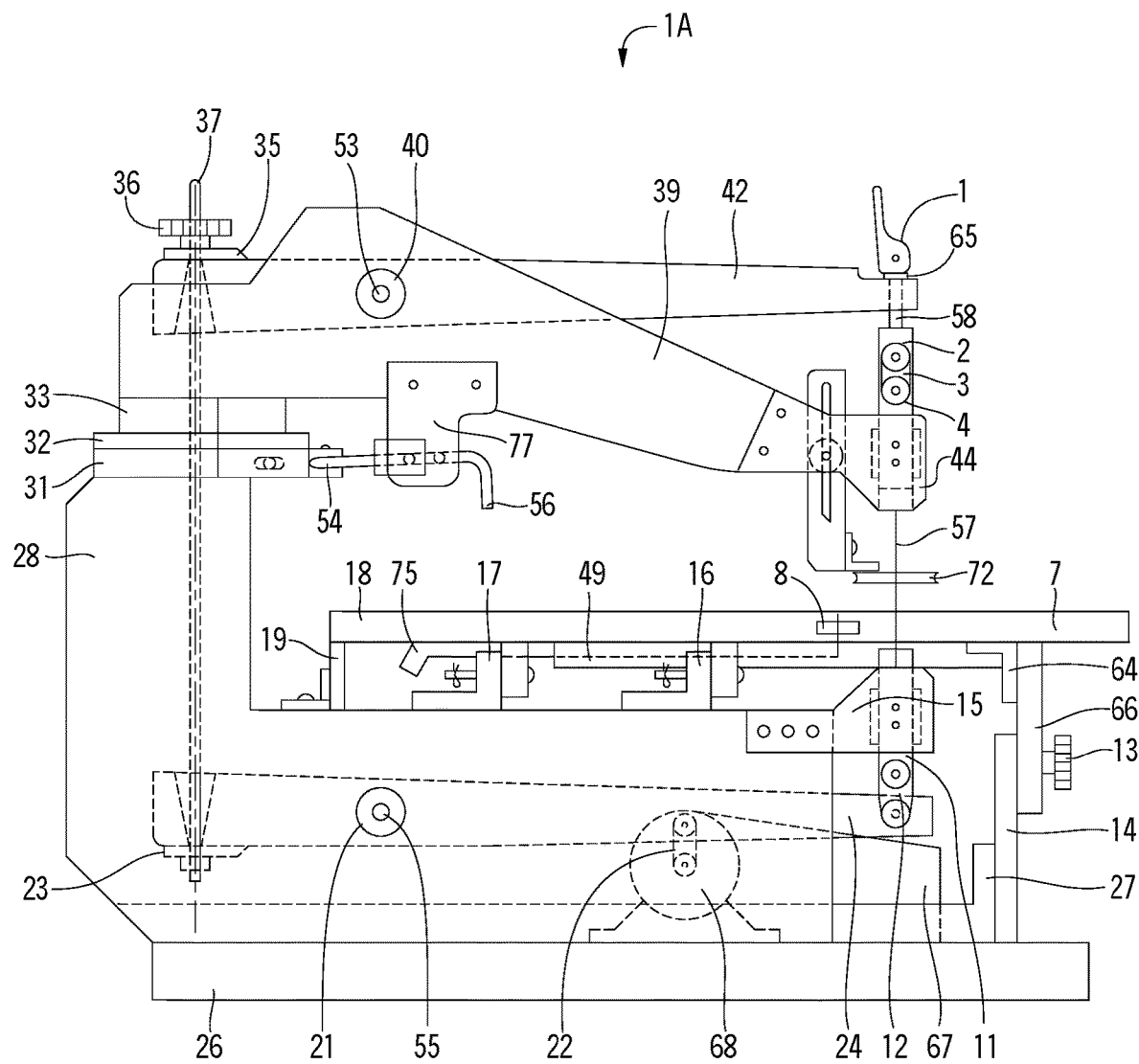
FIG. 2 is a left side elevation view of the present invention.

Turning to FIG. 2, shown therein is a view of the left side of the scroll saw 1A as viewed from the position of the operator.

Figure 3:
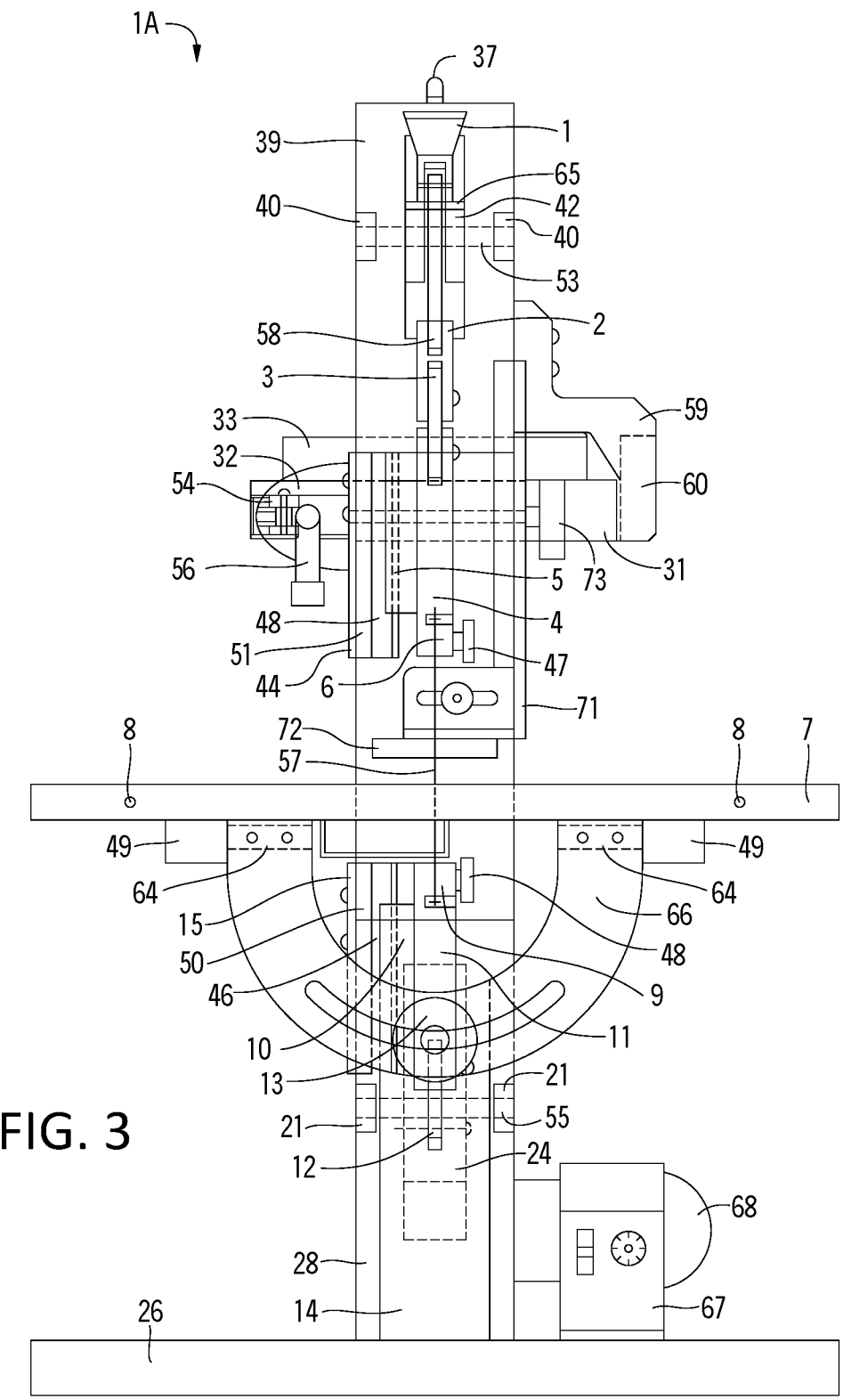
FIG. 3 is a front elevation view of the present invention.

Turning to FIG. 3, shown therein is a view of the front of the scroll saw 1A as viewed from the position of the operator.

Figure 4:
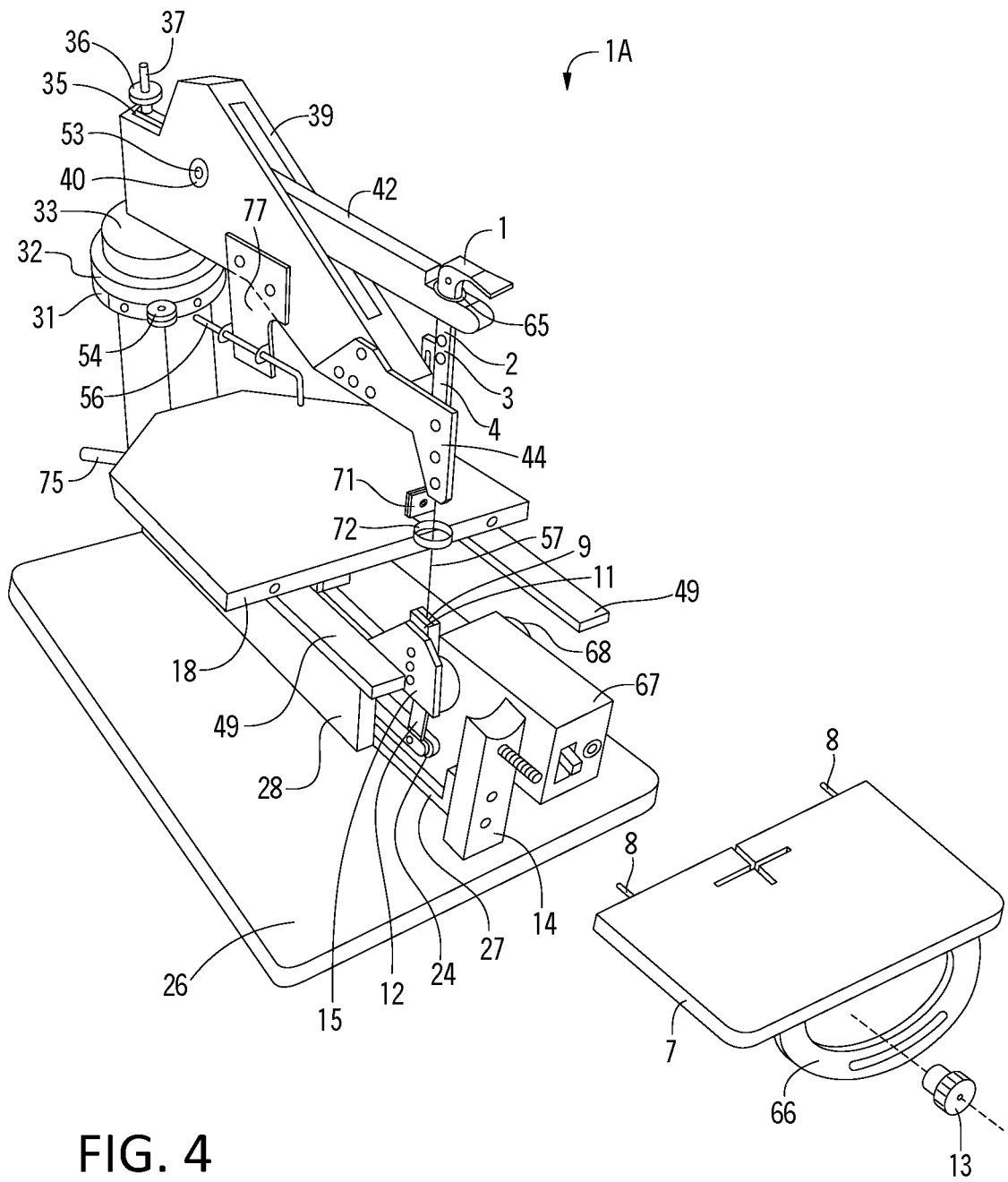
FIG. 4 is a perspective view of the present invention taken from the left front.

Turning to FIG. 4, shown therein is a perspective view of the scroll saw 1A demonstrating how the front section of the tiltable saw table 7 can be easily removed, which allows easy access to the saw blade 57 and the interconnecting top and bottom blade clamps 6, 9, upper and lower vertical blade carriers 4, 11, and bearing assemblies.

Continuing with FIG. 4, therein is shown how the front section of the table 7 of the scroll saw which is supported by two arms 49, held in position by two dowel pins 8, and the hand knob 13, on the front of the scroll saw. To remove the front table section 7, the scroll saw operator only needs to unscrew and remove the hand knob 13 and pull the front section free from the scroll saw. Removing the front section of the work table 7 section allows easy access to the entire lower front area including the lower arm 24, lower blade 57, blade carrier 11, and lower linear bearing and bearing slide 46.

The rear section 18 of the work table is also easily removable once the front section 7 is removed. The scroll saw operator only needs to pull the two removable spring pins 8 that hold the free-floating shafts that connect the two table swivel parts together. With the spring pins 8 removed, the operator only needs to pull the rear work table section 18 forward a few inches to remove it from the frame.

Figure 5:
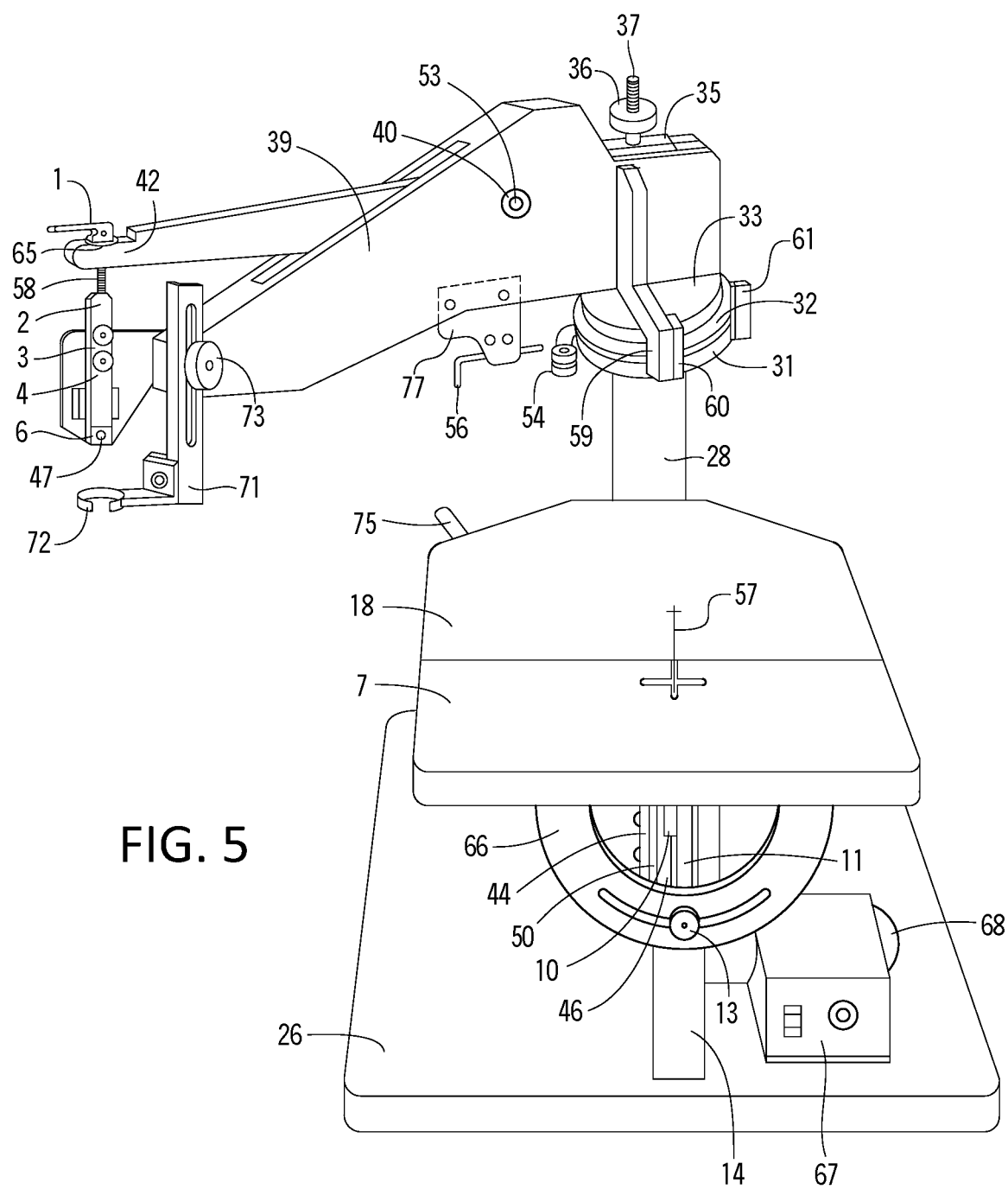
FIG. 5 is a perspective view of the present invention taken from the upper front.

Turning to FIG. 5, shown therein is a perspective view showing the feature which allows the upper frame assembly section 39 with the upper pivotable arm 42 to rotate to the side and clear of the table work space. By being able to rotate the top section 39 out of the way, it is easier and quicker for the operator to mount the work piece to be cut onto the blade 57 for the purpose of executing an inside cut which requires the saw blade to be inserted into an access hole previously drilled through the work piece at the site to be cut. To change the position of the saw blade 57 from one cutting position to another, the operator only needs to release the saw blade 57 from the top blade clamp 6 then release the top arm lock/unlock device 56 and gently push the upper frame arm and the arm easily rotates to the side and clear of the table work space. Once the operator has inserted the scroll saw blade 57 through the proper hole in the work piece, the operator only needs to rotate the upper arm assembly 39 into its forward operating position, engage the upper arm locking/unlocking device 56 to secure the upper arm 42 into place, then re-attach the scroll saw blade 57 to the upper blade carrier 4 with the upper blade clamp 6. The change from one position to another usually only takes a few seconds.

Continuing with FIG. 5, therein is shown how the upper arm 42 of this scroll saw can be unlatched and rotated horizontally to the side of the table 18 and clear of the work area. This orientation allows for a much easier and more efficient way to move the scroll saw blade 57 for one cutting position to another. The scroll saw operator only needs to detach the upper end of the scroll saw blade 57 from the upper blade carrier 4, then pull the upper arm lock/unlock release handle 56 toward the front of the scroll saw 1A and rotate the handle 90 degrees to lock it into its open position. Then the scroll saw operator only needs to push the arm 42 to the side. The rear of the upper arm assembly 39 is attached to a turntable bearing 32 on the rear of the bottom frame section and the upper arm assembly will easily rotate horizontally to the side and clear of the work table 18. With the upper arm assembly 39 rotated to the side and clear of the work space, the scroll saw operator can more easily and efficiently place the workpiece onto the scroll saw blade 57. Then the scroll saw operator only needs to reverse his movements by rotating the upper arm assembly 39 back into its forward working position and push the lock/unlock release handle 56 toward the rear and into the locked position. Then the operator only needs to reattach the upper end of the scroll saw blade 57 to the lower end of the upper blade carrier 4 and the scroll saw is ready for its next operation.

One skilled in the art would understand that the turntable bearing or rotating member 32 is disposed in the frame 28 with portions of the frame above the rotating member 32 and a portion of the frame below the rotating member. Rotating member 32 may also be known as a turntable bearing or a slewing bearing. Rotating member 32 could have an inner ring and an outer ring which rings have a plurality of ball bearings disposed in between the inner and outer rings which ball bearings roll on a race or bearing track which is formed in the surfaces of the mating inner and outer rings along with an upper and lower seals which keep the space between the inner and outer rings clean; it may also include an upper flange plate which is welded or otherwise attached to the upper portion of frame 28 along with a lower flange plate which is attached to the lower portion of the frame. The inner ring is joined to the upper flange plate using nuts and bolts and the outer ring is joined to the lower flange plate using nuts and bolts so that the entire assembly of the rotating member 32 is fixedly attached to the frame 28. The rotating member 32 allows the upper frame assembly 39 to rotate in an arc in a horizontal plane.

Figures 6, 6A:
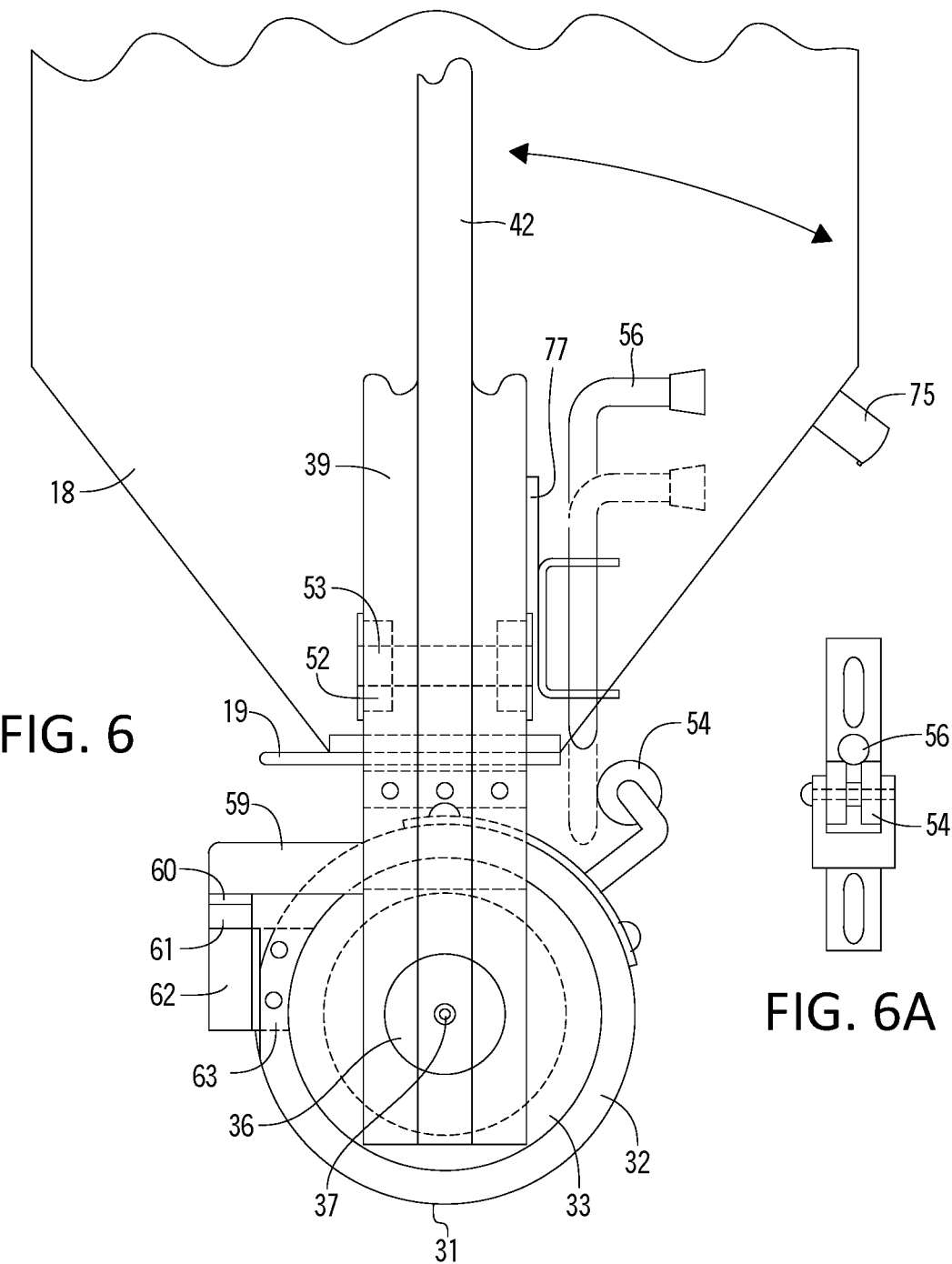
FIG. 6 is a plan view of portions of the present invention.
FIG. 6A is a side view of the upper arm locking assembly of the present invention.

Turning to FIG. 6, shown therein is a top view of the scroll saw 1A rear section showing details of the upper arm lock/unlock device 56 that when released allows the upper arm section 42 to rotate to the side and clear of the work area. To return and secure the upper arm assembly into its forward working position, the operator only needs to rotate the upper frame arm assembly 42 into its forward position and push the locking mechanism 56 toward the rear. The locking bar 56 rolls into place by engaging the two rollers 54, which allows the locking bar to move into or out of its locking position without sliding metal--to-metal friction which would quickly cause undue wear to the engaging parts. The rear section contains the turntable bearing 32 which allows the upper arm 42 to rotate horizontally, i.e., in the horizontal plane, and clear of the work area.

Turning to FIG. 6A, shown therein is a side view of the upper frame arm lock/unlock roller assembly 54 which allows the lock/unlock handle 56 to roll into place behind the rollers, preventing the wear that would be caused by metal-to-metal sliding contact.

Figure 7:
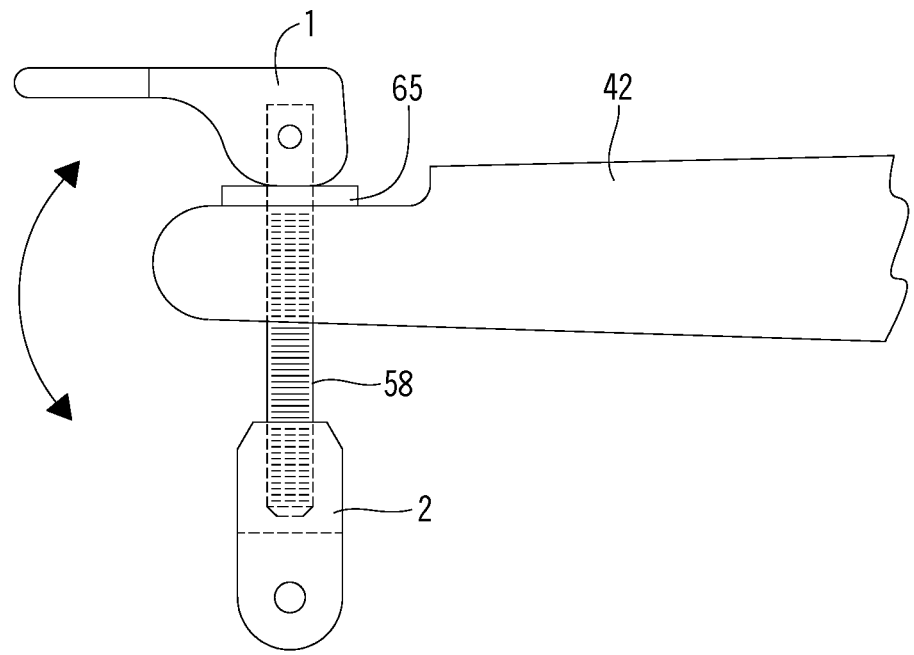
FIG. 7 is a side view of portions of the upper pivotable arm of the present invention.

Turning to FIG. 7, shown therein is a side view of the upper pivotable arm (42), the blade tension device 1, the blade tension adjusting block 2, and the blade tension adjusting screw 58. The arm 42 moves up and down a short distance, about three-quarters of an inch at the forward end of the pivotable arm where the scroll saw blade carrier 4 (see FIG. 8) is attached. As the arrow shows, the forward end of the pivotable arms 42 travels on a radius as they move vertically up and down.

Continuing with FIG. 7, therein is shown the upper blade adjustment assembly: upper pivotable arm 42, scroll saw blade adjustment block 2, saw blade adjustment screw 58, hardened washer 65, and adjustable tensioning device 1. The adjustable blade tensioning device 1, tightens or loosens the scroll saw blade by simply raising or lowering the handle on the front of the device which engages the cam configuration on the bottom of the device, which engages the upper pivotable arm 42 via the hardened washer. The blade tensioning device can be screwed or unscrewed onto the saw blade adjusting screw so as to position the adjustable blade tensioning device 1 so that its cam action tightens the saw blade tension to the correct tension. The lower end of the blade adjustment block 2 is made to connect to the upper end of link 3 (shown in FIG. 8).

Figure 8:
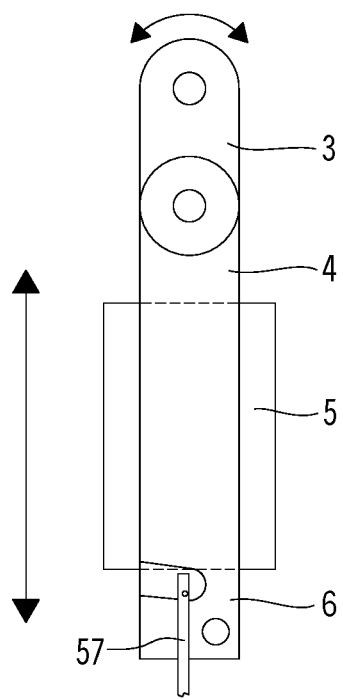
FIG. 8 is a side view of portions of the upper link of the present invention.

Turning to FIG. 8, shown therein is a side view of the upper link 3, upper blade carrier 4, the upper linear bearing 5, the upper blade camp 6, and the upper end of the scroll saw blade 57. This side view shows the upper blade link 3 attached to the upper end of the blade carrier 4 and the arrow shows that the upper blade link moves back and forth at its top end and its motion follows the radial motion of the upper arm 42 which allows the scroll saw blade to travel in a vertical motion by the linear bearing 5 on its slide. The links 3, 12 allow the arms 42 to travel up and down in a radial motion independent of the scroll saw blade 57 which is allowed to travel in a true vertical motion without being carried back and forth by the radial motion of the pivotable arms. The scroll saw blade 57 does not move forward and back. The upper 3 and lower 12 links move forward and back, following the motion of the pivotable arms 42.

Figure 13:
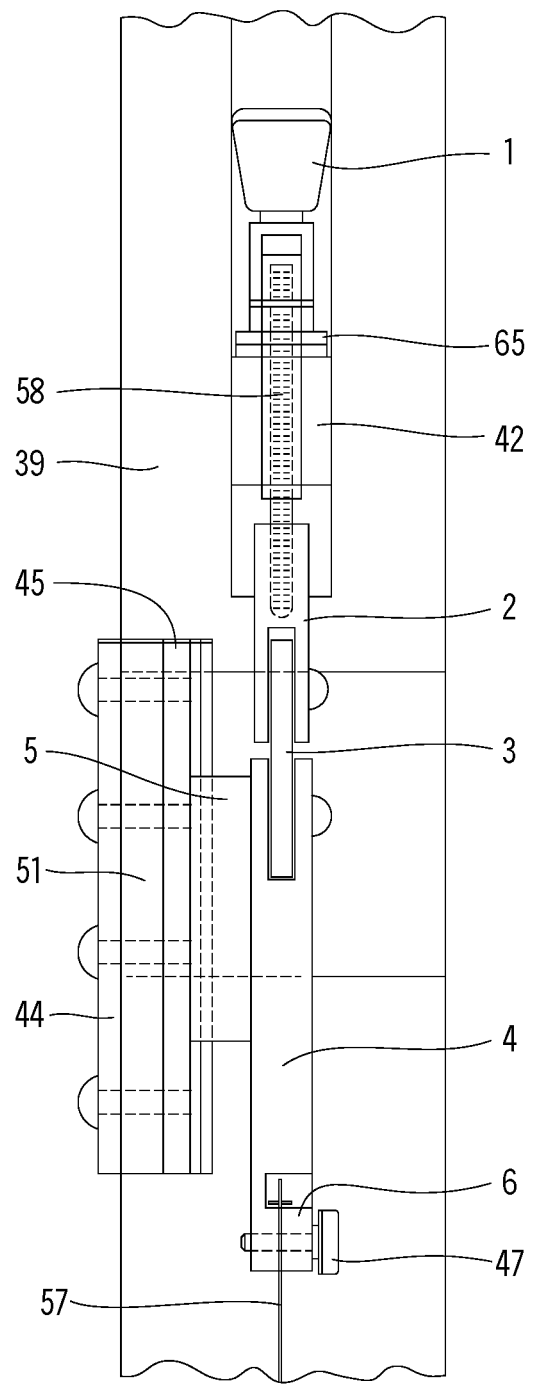
FIG. 13 is a front view of portions of the upper front section of the present invention.
Figure 14:
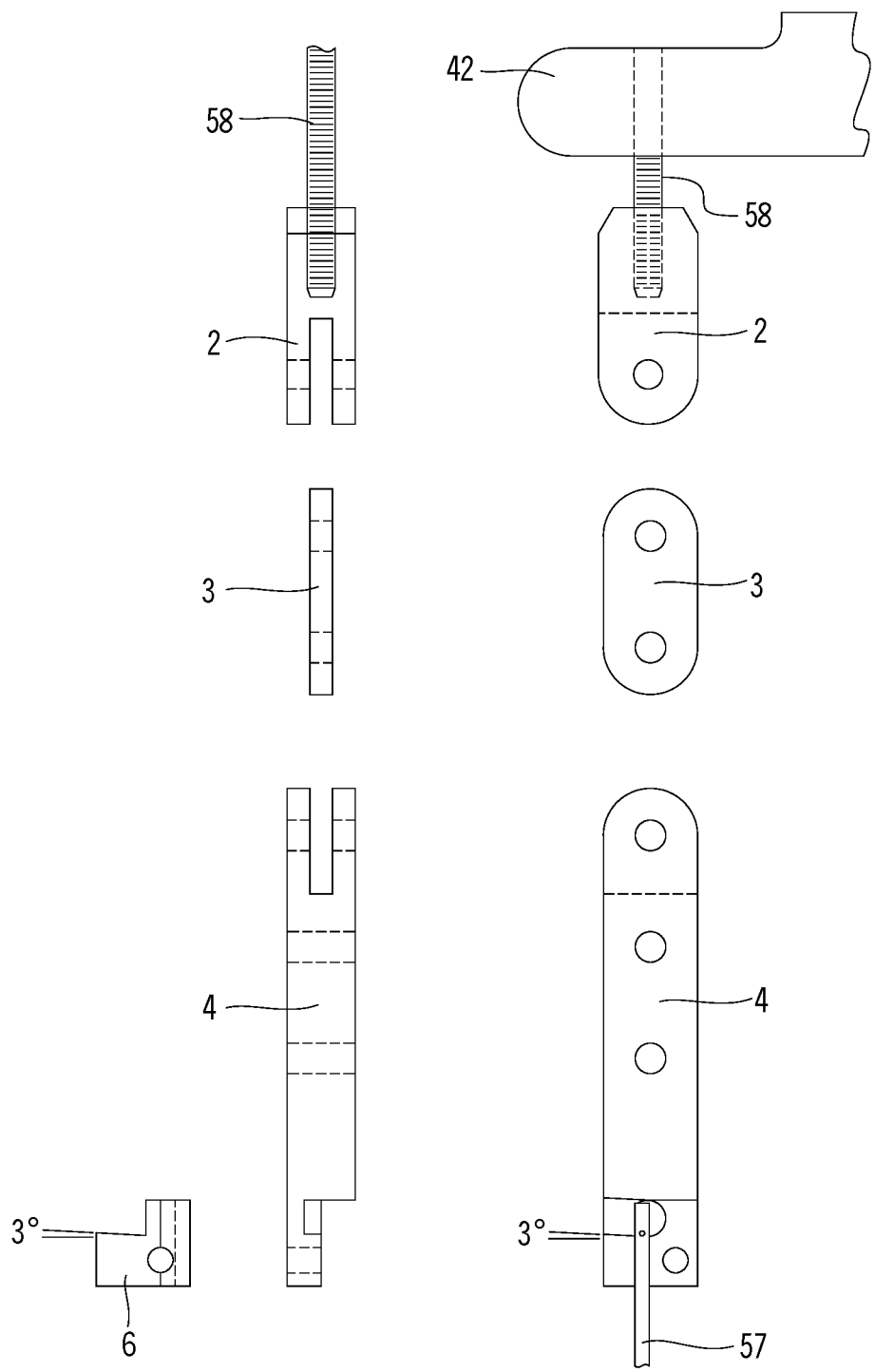
FIG. 14 is an exploded view of portions of the upper blade carrier assembly of the present invention.

Continuing with FIGS. 7 and 8, therein is shown a view of the upper link assembly: Upper arm 42, adjustable blade tensioning device 1, hardened washer 65, blade tensioning screw 59, adjustable blade tensioning black 2, upper link 3, upper blade carrier 4, upper linear bearing 5, upper blade clamp 6, and upper end of the scroll saw blade 57. The links 3, 12 connect the blade carriers 4, 11 to the pivotable arms 34, 42 and as the pivotable arms cycle up and down, the links pivot back and forth following the radial path of the arms. This link action allows the scroll saw blade 57 to travel vertically up and down on the blade carriers 4, 11 without having to move horizontally back and forth. The links 3, 12 allow the scroll saw blades 57 and the blade carriers 4, 11 to move independently of the pivotable arms 24, 42 and move on dedicated tracks with linear bearings. FIG. 13 shows the assembly view of the arm, link 3, and blade slide 45. FIG. 14 shows the exploded view of the arm, link 3, and blade slide. The true up and down vertical motion of the scroll saw blade 57 eliminates most of the chatter caused by the horizontal motion of the blade on the up and down strokes. This allows the scroll saw operator to make more precision cuts with much less workpiece chatter. It also saves a lot of time and frustration for the operator.

Figure 9:
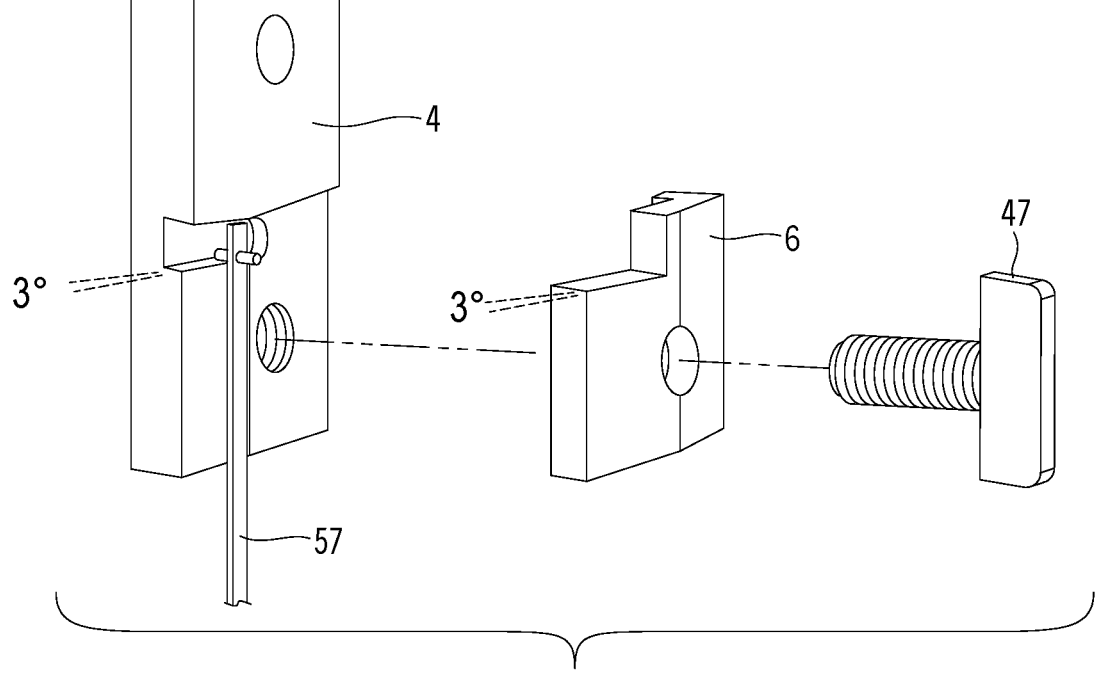
FIG. 9 is an exploded view of portions of the upper blade carrier of the present invention.

Turning to FIG. 9, shown therein is an exploded view of the upper blade carrier 4, upper blade clamp 6, the upper end of the scroll saw blade 57, and the upper thumb screw 47. This exploded view also shows that there is a 3-degree relief angle machined into the slot on the blade carrier 4 where the scroll saw blade anchor pin rests after being installed. This angle helps to keep the scroll saw blade 57 from creeping forward during the operation of the scroll saw and aids in keeping the scroll saw blade centered in the carrier. The scroll saw blade clamp 6 also has a landing on the front that provides support for the opposite end of the anchor pin located near the upper end of the scroll saw blade.

Continuing with FIG. 9, therein is shown an exploded view of the upper blade clamp assembly: upper blade carrier 4, upper blade clamp 6, upper thumb screw 47, and upper scroll saw blade end 57. The view of the blade carrier 4, reveals a relief at the blade end. Within the top of that relief is a forward-facing slot that slants backward about 3 degrees. This slot provides clearance for the anchor pin located at each end of the scroll saw blade 57. The rearward slant of the slot also keeps the scroll blade 57 from moving forward while the saw is operating. The relief is the same size as the blade clamp 6 and allows the blade clamp to fit inside the relief and exert pressure on the scroll saw blade, holding it securely in place. The view also shows the blade clamp 6, and the forward landing that provide support for the opposite end of the saw blade anchor pin. The landing also slants backward at a 3-degree angle.

Figure 10:
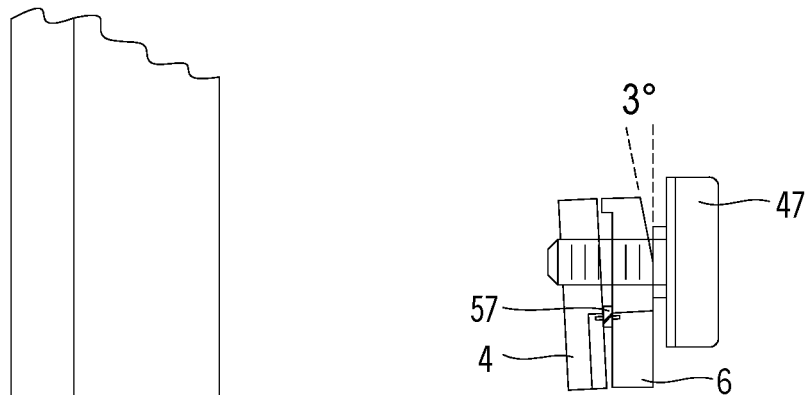
FIG. 10 is a top view of portions of the upper blade carrier of the present invention.

Turning to FIG. 10, shown therein is a top view of the assembly of the upper blade carrier 4, upper blade clamp 6, the upper end of the saw blade 57, and the upper thumb screw 47. This top view also shows the 3-degree relief at the rear of the blade clamp 6 which allows the blade clamp to rotate inward and close on the scroll saw blade 57 when the thumb screw 47 is tightened.

Continuing with FIG. 10, therein is shown a top view of the upper blade carrier 4, blade clamp 6, thumb screw 47, and the upper end of the scroll saw blade 57 as an assembly. FIG. 10 also shows a 3-degree relief on the rear/outside of the blade clamp 6 which allows the blade clamp to rotate inward against the scroll saw blade 57 without interference when the thumb screw 47 is tightened.

Figure 11:
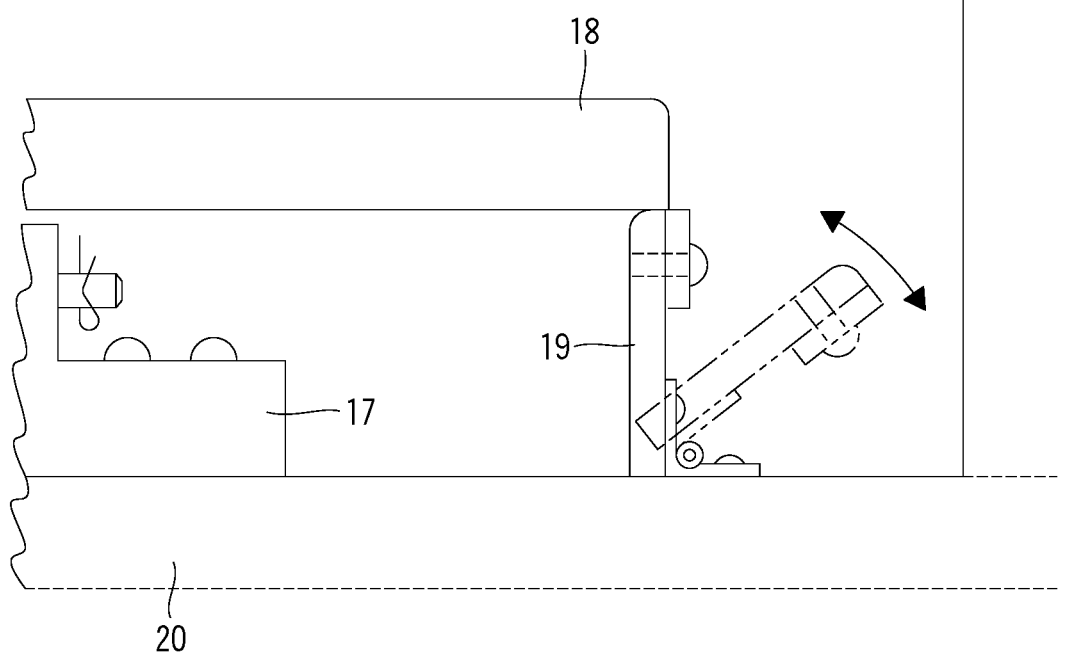
FIG. 11 is an enlarged right side view of the table-leveling device of the present invention.

Turning to FIG. 11, shown therein is the table-leveling device 19, the tilting table 18, the rear table swivel 17, and the lower frame section 28. When the table-leveling device 19 is raised into its vertical position, it supports the tiltable table 18 in a position that is level or perpendicular to the vertical centerline of the scroll saw blade 57. After making an angle cut, the scroll saw operator need not use a compass or other measuring device to return the scroll saw table to its level position. The scroll saw operator only needs to raise the table-leveling device 19 into its upright position which can be quickly done and the table-leveling device firmly supports the scroll saw table in its level position.

Continuing with FIG. 11, therein is shown a table-leveling device 19 beneath the rear of the scroll saw work table that both automatically levels and supports the work table 18. To level the work table 18, the scroll saw operator only needs to raise the table leveling device 19 into position beneath the rear of the work table. The device automatically levels the work table 18 into its proper radial and level position, and also provides support for the work table. This method provides accuracy and only requires a few seconds to raise the device into place. To adjust the table 18 radially, the operator only needs to lower the table leveling device to its horizontal position.

Figure 12:
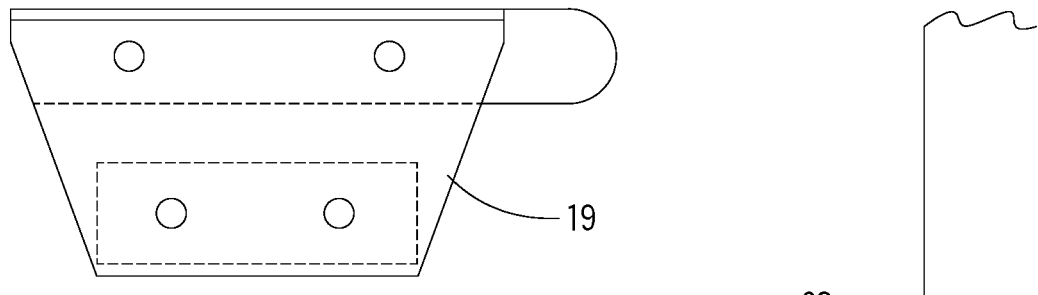
FIG. 12 is an enlarged front view of the table-leveling device of the present invention.

Turning to FIG. 12, shown therein is a front view of the table-leveling device 19 with its hinge and handle.

Turning to FIG. 13, shown therein is a front view of the upper/front section of the scroll saw showing the assembly of the upper pivotable arm 42, adjustable blade tensioning device 1, blade tensioning screw 58, and the saw blade adjustment block 2. This view also shows the upper link 3 connecting the upper blade tensioning assembly to the upper blade carrier 4. The upper blade carrier 4 is, in turn, attached to the linear bearing 5, and the linear bearing and linear bearing slide 45, and a spacer 51. The entire assembly is bolted to the upper mounting plate 44, which is, in turn, bolted to the rotatable upper frame section.

Turning to FIG. 14, shown therein is an exploded view of the upper blade carrier assembly: Upper arm 42, upper blade tensioning screw 59, upper blade tensioning block 2, upper link 3, upper blade carrier 4, upper blade clamp 6, upper end of the scroll saw blade 57, their configurations and their relative positions.

Figure 15:
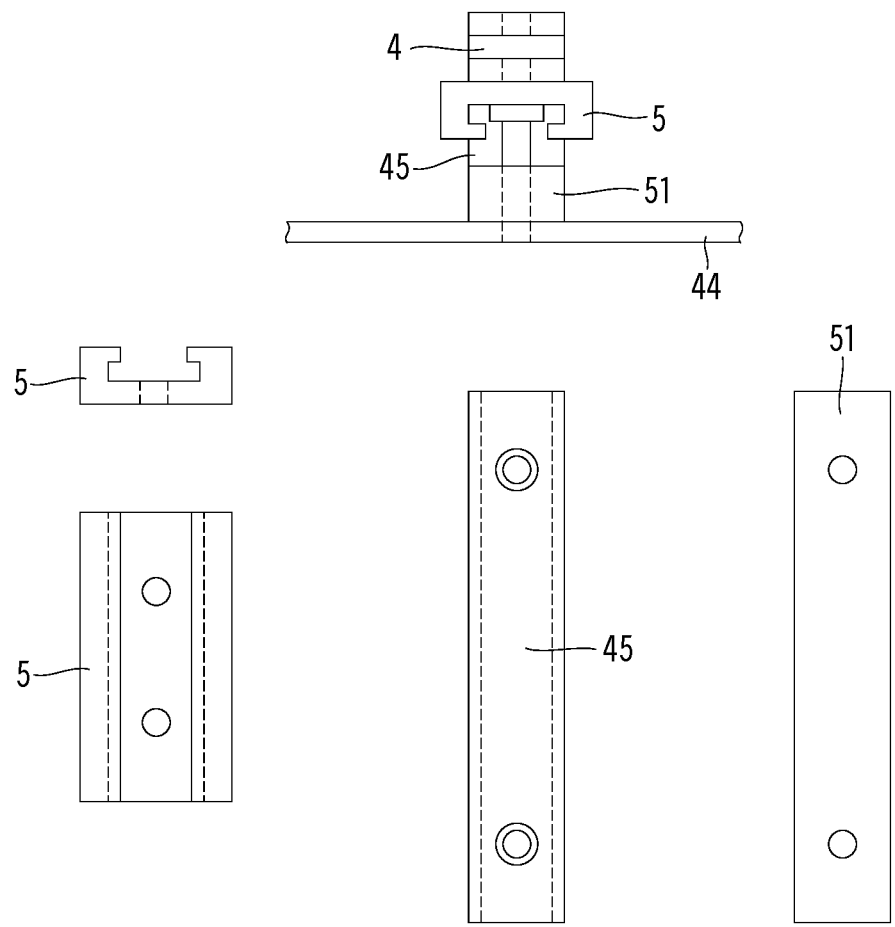
FIG. 15 is a top view of portions of the upper blade carrier assembly of the present invention.

Turning to FIG. 15, shown therein is a view of the upper blade carrier 4, linear bearing 5, linear bearing slide 45, spacer 51, and the mounting plate 44, and the top view shows the relative position of each part in the assembly.

Figure 16:
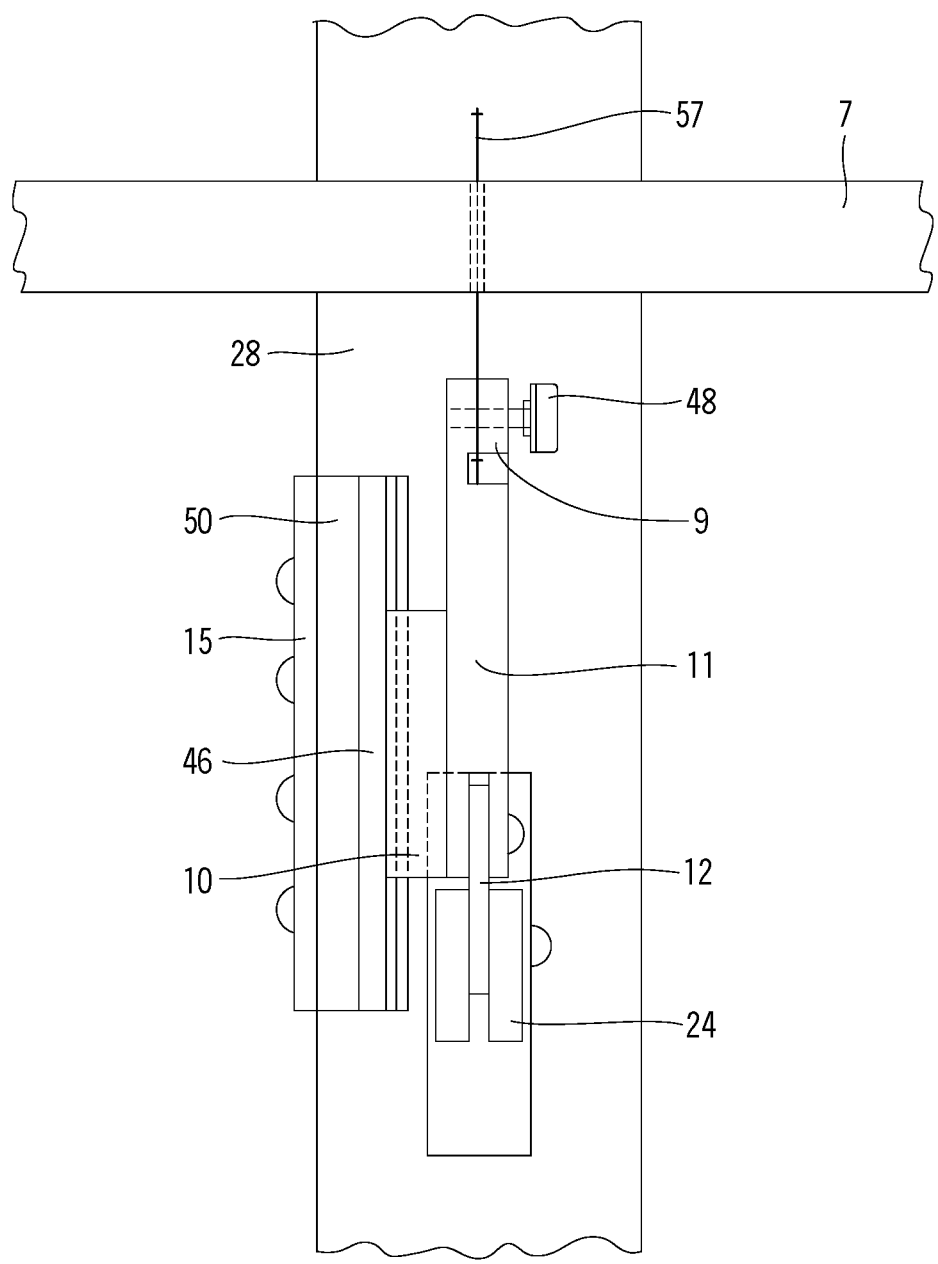
FIG. 16 is a front view of portions of the lower section of the present invention.

Turning to FIG. 16, shown therein is a front view of the lower section of the scroll saw showing the assembly of the lower arm 24, lower link 12, lower blade carrier 11, lower linear bearing 10, lower linear bearing slide 46, lower spacer 50, lower blade clamp 9, lower thumb screw 48, and the entire assembly is bolted to the lower forward mounting plate 15, which, in turn, is bolted to the lower frame section.

Figure 17:
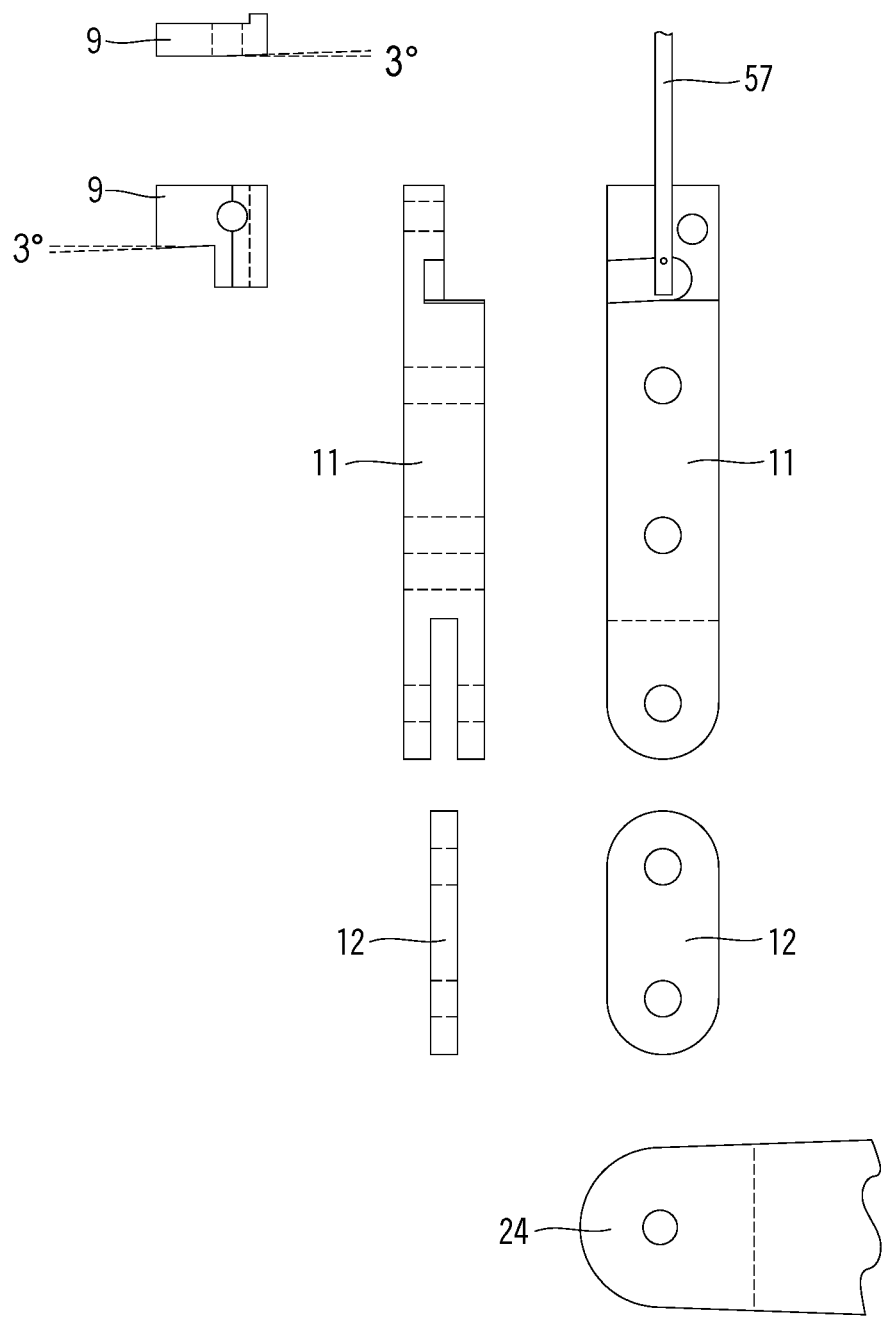
FIG. 17 is an exploded view of portions of the lower blade carrier assembly of the present invention.

Turning to FIG. 17, shown therein is an exploded view of the lower blade carrier assembly, including the lower pivotable arm 24, side and edge view of the lower link 12, side and edge view of the blade carrier 11, side and edge view of the lower blade clamp 9, and the lower end of the scroll saw blade 57, and all the parts in their respective positions.

Figure 18:
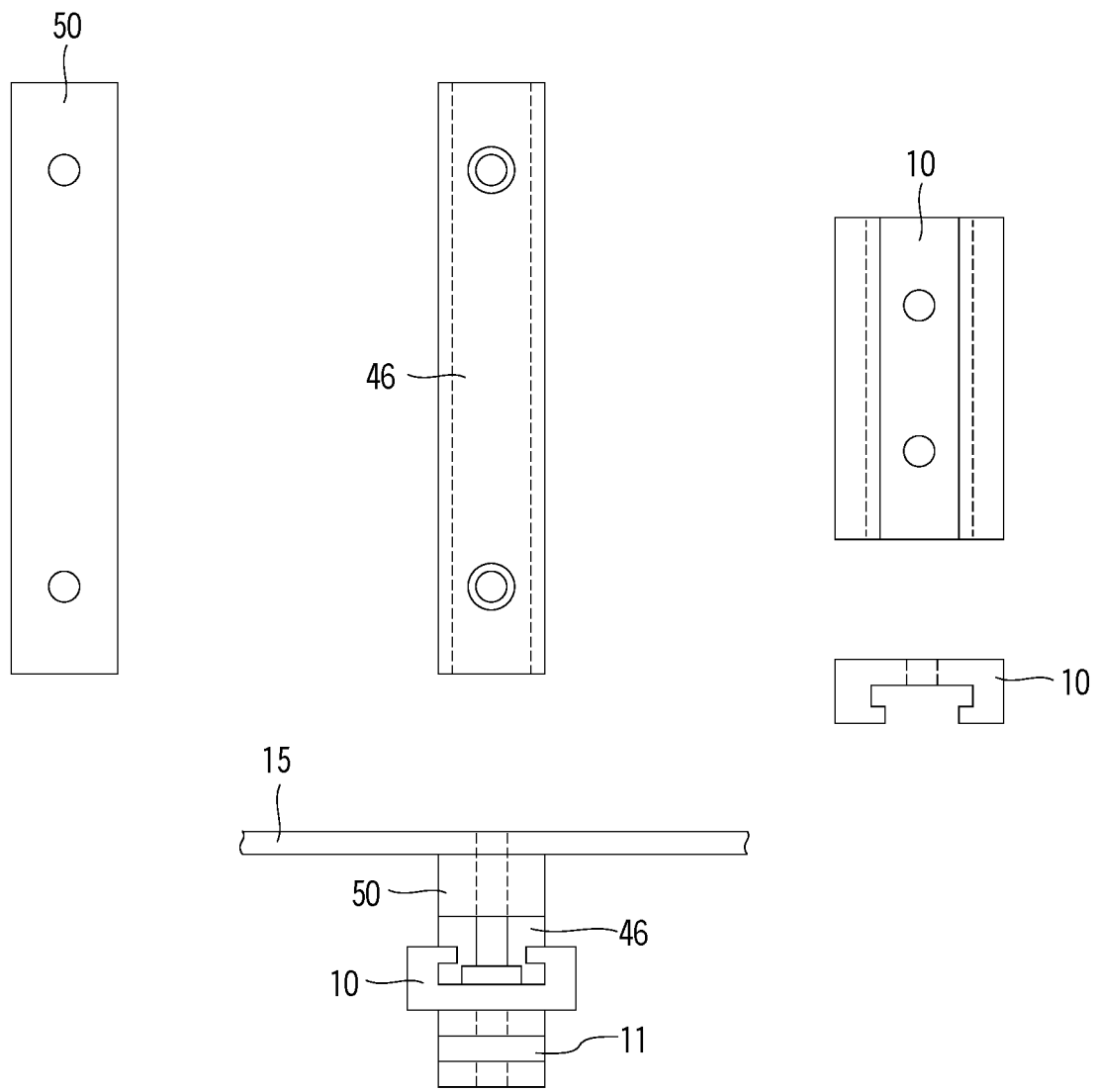
FIG. 18 is a top view of portions of the lower blade carrier assembly of the present invention.

Turning to FIG. 18, shown therein is a view of the lower blade carrier 11, linear bearing 10, linear bearing slide 46, spacer 50, lower mounting plate 15, and the bottom view shows the relative position of each part in the assembly.

Figure 19:
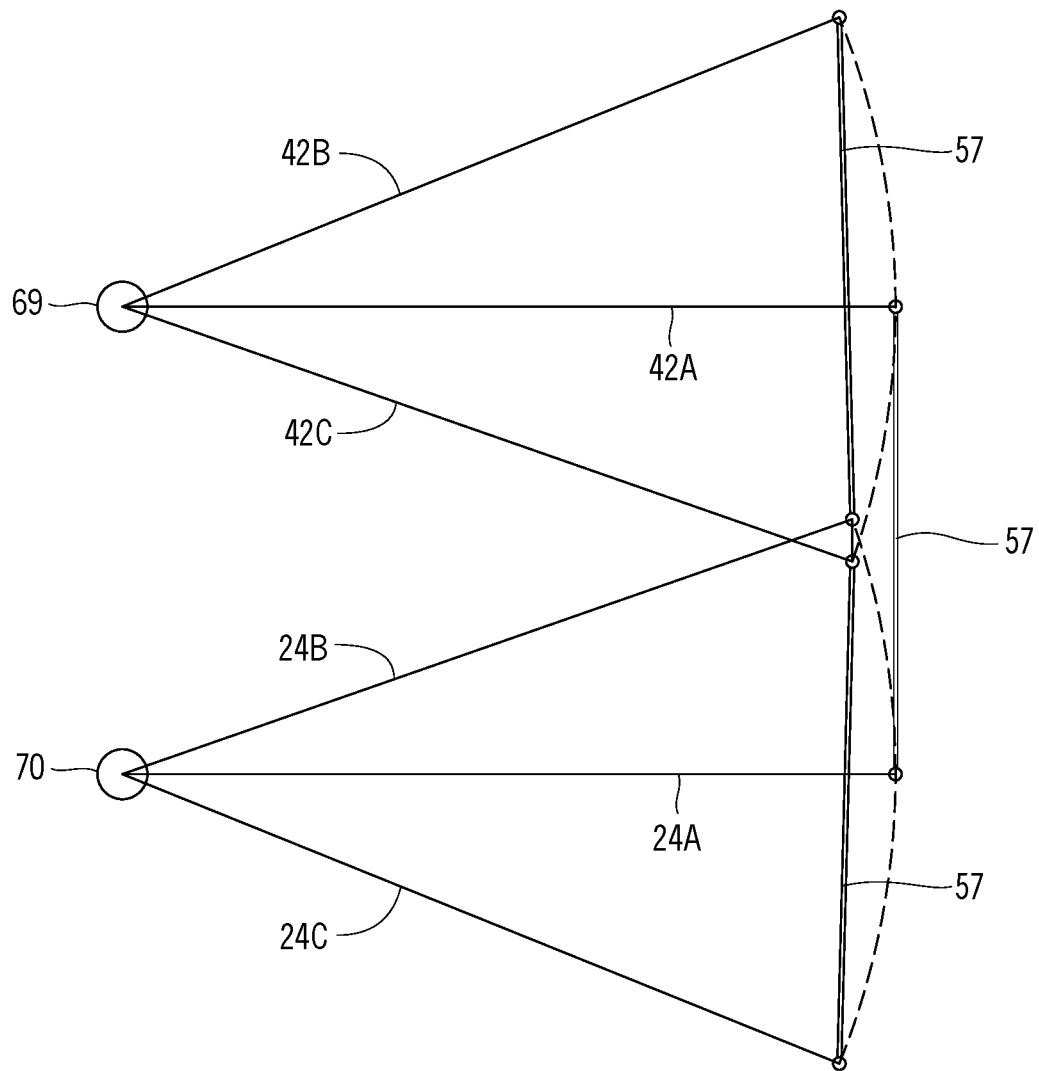
FIG. 19 shows the motion of the upper and lower pivotable arms and blade of the present invention.

Turning to FIG. 19, shown therein is the motion of the upper and lower pivotable arms and scroll saw blade. Lines 42-A and 24-A shows the upper and lower pivotable arms at rest in their level position, and the scroll saw blade 57-A in its forward position. Lines 42-B and 24-B shows the upper and lower pivotable arms in their raised position, and the scroll saw blade 57-B in its rear position. Lines 42-C and 24-C shows the upper and lower pivotable arms in their lowered position and the scroll saw blade 57-C again in its rear position. As the upper and lower stroke arms move up and down in their vertical motion, they also move in a radial path, carrying the scroll saw blade with them in a radial path. As the scroll saw operates and makes radial cuts, the scroll saw blade moves forward and backward during the up and down stroke. This causes the front surface of the scroll saw blade to hit the forward wall of the cut being made on the down stroke and the rear surface of the scroll blade hits the rear wall of the cut on the upward stroke. This situation tends to move the work piece in a up/down motion lifting the work piece on the up stroke and slamming the work piece down onto the table surface on the down stroke creating a violent chattering of the work piece on the scroll saw table and moving up and down at the speed the scroll saw is operating. Some scroll saws can operate at speeds of up to 1,800 strokes/min. This situation makes it impossible for the operator to make precision cuts and often damages the workpiece. The use of workpiece hold-down devices do help the situation, but where the scroll saw blade only moves up and down in a vertical motion, the work piece chatter problem is mostly eliminated.

Continuing with FIG. 19, it shows the path the blade travels as the scroll saw is operating. The scroll saw blade remains in its vertical attitude as it travels through its up and down cycle, but the scroll saw blade is in a rearward position when the pivotable arms are on their up-stroke. The scroll saw blade is in a forward position when the pivotable arms are in their level position at their mid-stroke. The scroll saw blade is again in the rearward position when the pivotable stroke arms are in their down-stroke. This horizontal back and forth movement causes the workpiece to chatter violently on the work table. On the pivotable arms' up-stroke, the rear surface of the scroll saw blade makes contact with the rear wall of the cut being performed and that interference tends to raise the workpiece upward from the surface of the work table. On the down-stroke of the pivotable arms, the scroll saw blade makes contact with the front wall of the cut in the workpiece and the interference causes the scroll saw blade teeth to grab the workpiece and slam it down onto the work table surface on each up and down cycle. With operational speeds as high as 1,800 strokes/min, this violent and uncontrollable chatter makes it difficult or impossible for the scroll saw operator to make precision cuts and very often the violent chatter damages the workpiece. Mechanical workpiece hold-down devices offer a partial solution to the problem but workpiece hold-down devices are seldom 100% effective by themselves. It is an object of the present invention 1-A to be chatterless.

Figure 20:
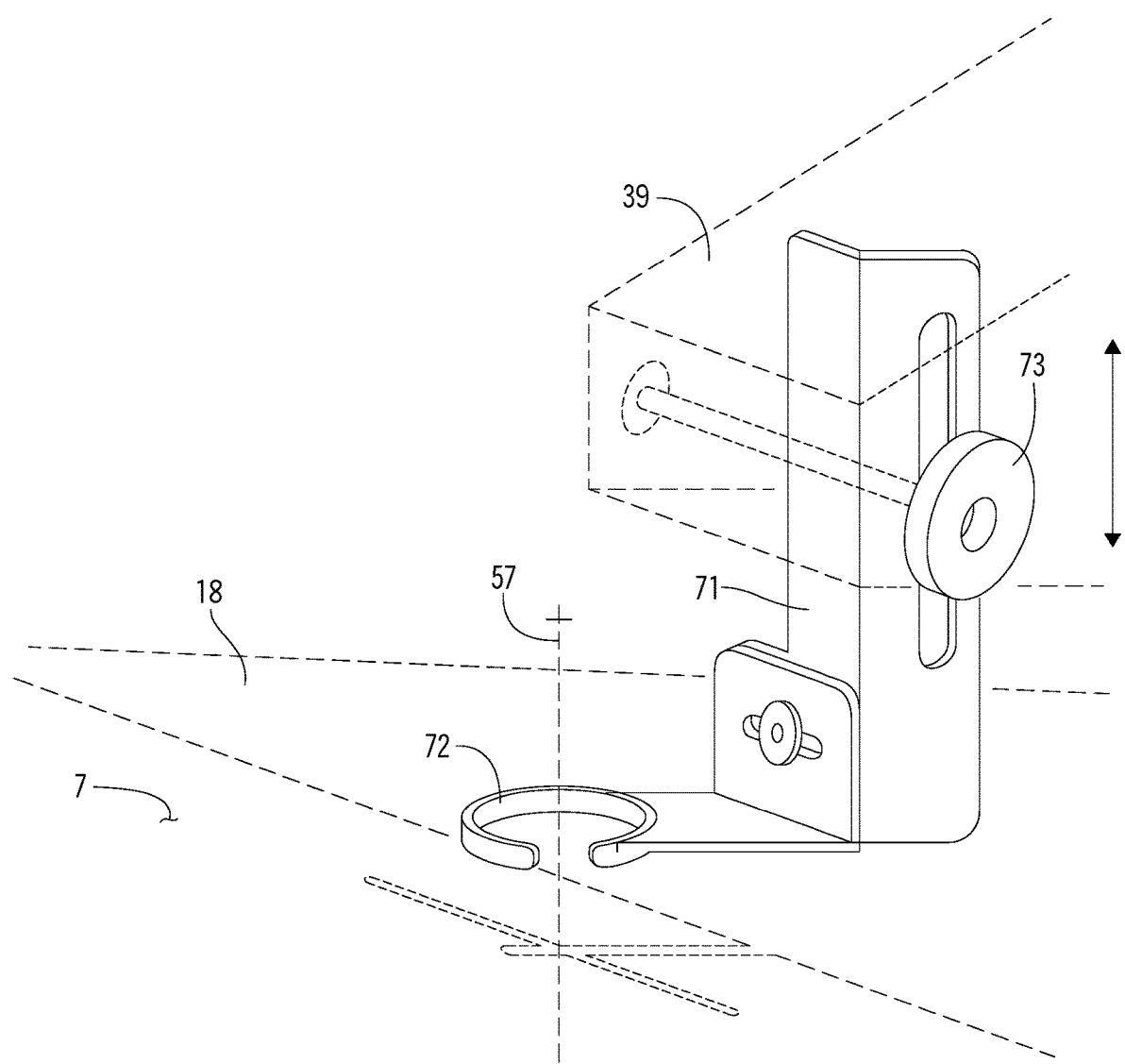
FIG. 20 is a perspective view of the workpiece hold-down device of the present invention.

Turning to FIG. 20, shown therein is a perspective view of the adjustable workpiece hold-down device 72 and the adjustable vertical slide 71. The actual work piece hold-down part 72 is radially adjustable, which allows it to follow the workpiece when the operator needs to make an angle cut as the table is tilted either left or right. Item 73 is the slide securing hand knob.

Continuing with FIG. 20, therein is shown a perspective view of a work table hold-down device. It consists of an adjustable slotted member 71, that fits against the forward end of the upper frame arm 39. The vertical member has a slot which allows it to be adjusted up and down vertically and secured by a hand knob 73. Attached to the bottom/forward section of the upright member is a hold-down device 72 that actually makes contact with the surface of the workpiece that is to be cut which is radially adjustable and is designed to follow the angle of the workpiece as the work table is being adjusted to make angle cuts. Item 72 has an opening in one side to allow the scroll saw blade 57 to pass through when the upper arm assembly 39 is rotated to the side with the scroll saw blade still in place.

Figure 21:
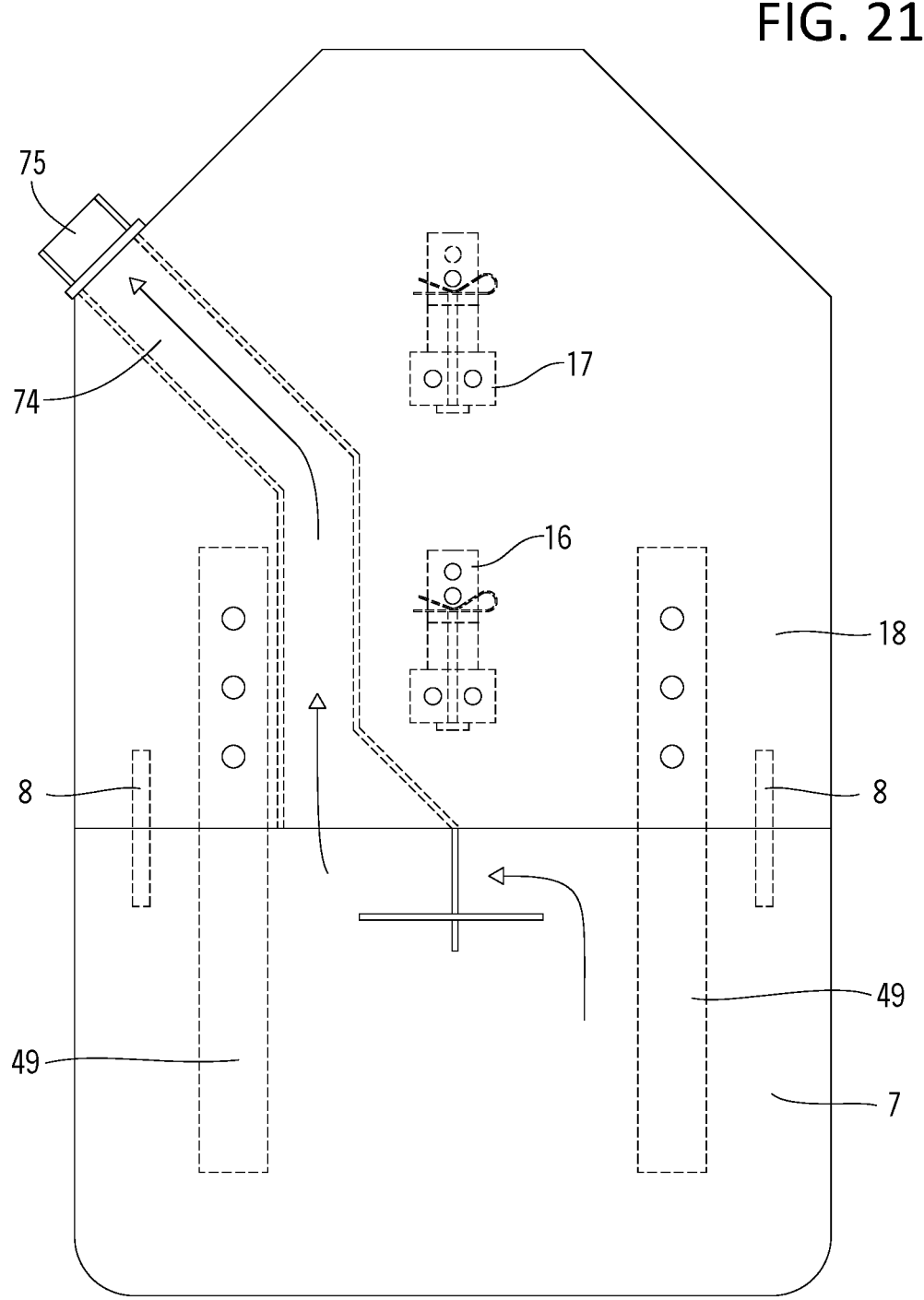
FIG. 21 is a top view of the table of the present invention.

Turning to FIG. 21, shown therein is a top view of the tiltable scroll saw table 7 and 18 sections. The view shows the vacuum channel 74 and its position beneath the scroll saw table. The channel terminates at the rear with a vacuum cleaner nozzle 75 which allows the channel to attach to a standard vacuum cleaner hose in order to remove the saw dust generated by the action of the cutting of the scroll saw blade. As the vacuum device operates, air flows from the front and into the channel 74 leading to the rear of the scroll saw table, carrying the saw dust with it.

Turning to FIG. 22, shown therein is a side view that shows the upper 42 and lower 24 pivotable arms and the threaded rod 37 that connects the rear ends of the two arms. Also shown is the rear tension adjusting knob 36, the upper and lower ball joints 35 and 23, and the upper and lower tapered nuts 76 that contact the ball joints.

Figure 23:
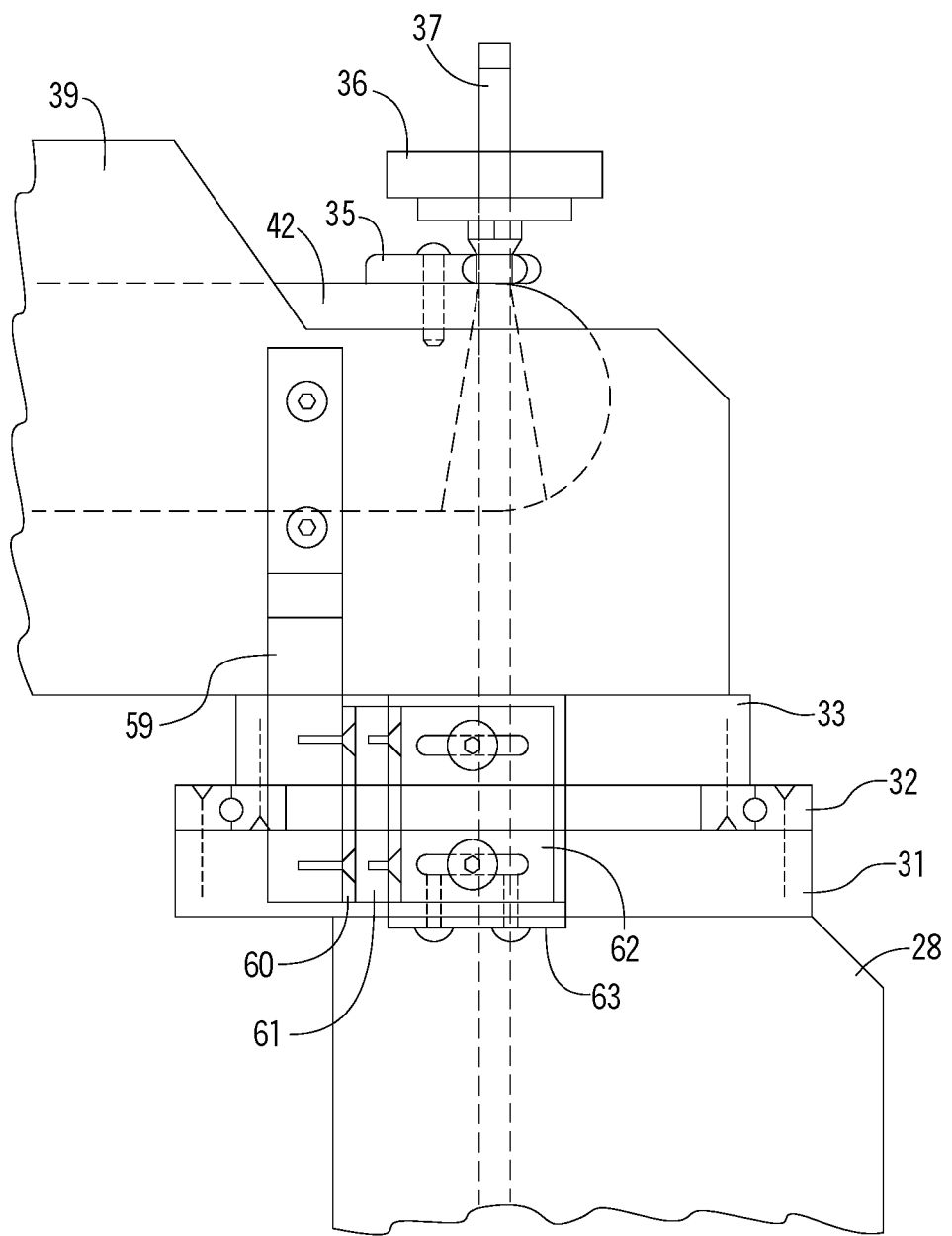
FIG. 23 is a side view of portions of the magnet assembly of the present invention.

Turning to FIG. 23, shown therein is a side view of the magnet assembly that secures the upper frame arm 39 into its forward working position until the upper arm locking/unlocking device 56 can be engaged: the upper mounting bracket 59 attaches to the upper frame arm. Metal plate 60 attaches to the upper bracket 59 and the magnet 61 that attracts to the metal plate 60 to hold the upper frame arm 39 in its forward operating position until the upper arm lock/unlock mechanism 56 can be engaged. The adjustable mounting bracket 62 attaches to the magnet 61 and the angle bracket 63 bolts to the lower circular mount for the outer ring 63 of the turntable bearing 31. The adjustable mounting bracket 62 bolts to the angle bracket 63 and serves to adjust the magnet/stop to align the upper frame arm 39 to its correct operating position. The upper mounting bracket 59 and the attached metal plate 60 rotate with the upper frame arm 39. The magnet 61, the adjustable magnet bracket 62 and the angle mounting bracket 63 remain stationary attached to the lower frame section.

Continuing with FIG. 23, therein is shown the upper frame arm magnetic stabilizing assembly: upper frame arm 39, upper pivotable arm 42, upper frame arm mounting bracket for mounting the steel plate 59, retaining magnet 61, adjustable magnet mounting plate 62, and angle bracket for mounting the adjustable magnet mounting plate 63. The magnet assembly is used to hold the horizontally rotating upper frame arm 39 secure in its forward operating position until the upper arm lock/unlock device 56 can be engaged.

By way of summary and by making reference to FIG. 1-23, the present invention 1A discloses a method of making a scroll saw 1A which includes a base 26 having an upright frame 28 mounted on the base and extending upwardly for supporting a work table 7, mounting upper and lower pivotable arms 24, 42 on the upright frame, wherein the pivotable arms are operatively driven by a motor 68; attaching a saw blade 57 having upper and lower ends to the upper and lower pivotable arms, wherein the saw blade reciprocates vertically in response to up and down movement of the upper and lower pivotable arms; mounting the work table horizontally on the upright frame and supporting it on the base upon which a workpiece can be placed; an upper frame assembly 39 including the upper pivotable arm extending from the upright frame across the work table; and a rotatable member 32 in the upright frame to permit the upper frame assembly and said upper pivotable arm to rotate in a horizontal plane. Furthermore, wherein the rotatable member includes a turntable bearing and wherein a front portion 7 of the work table can be separated and removed from the scroll saw to permit the saw blade to be accessed and a pair of arms 49 disposed underneath the work table for supporting the work table on said scroll saw, wherein the front portion of the work table can be removed by unscrewing a single hand knob 13 from the scroll saw allowing the front portion of the work table to be slidingly removed on the pair of arms. Also, a work table leveling device 19 disposed on a rear end of the work table to permit the work table to be leveled and wherein the work table leveling device has a pivoting member 19 of predetermined length extending upwardly from a frame spacer 20 for leveling the work table, wherein the work table leveling device pivots between a first vertical position and a second angled position (see FIG. 11). Also, wherein the saw blade travels in a true vertical motion to minimize workpiece chatter and includes an upper link 3 for connecting the upper end of the saw blade to the upper pivotable arm and a lower link 12 for connecting the lower end of the saw blade to the lower pivotable arm. Also, wherein the saw blade position remains centered in an upper saw blade carrier 4 during operation to prevent the saw blade from creeping forward during operation and wherein the upper saw blade carrier 4 has a slot therein (see FIG. 9), wherein the slot includes an approximate three-degree relief angle to prevent the saw blade from creeping forward during operation.

Lines with arrowheads are sometimes placed on drawings to indicate potential motion or direction of movement of an item illustrated in the drawing.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description may be intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B. C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively inclusive elements includes at least one element of the listed elements. However, an example described using a list of alternatively inclusive elements does not preclude another example that includes all of the listed elements. An example described using a list of alternatively inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

I claim:

1. A scroll saw, comprising:
   a) a base having an upright frame mounted on said base and extending upwardly for supporting a work table, upper and lower pivotable arms mounted on said upright frame, and a motor for driving said upper and lower pivotable arms;
   b) a saw blade having upper and lower ends being reciprocatedly attached to said upper and lower pivotable arms, wherein said saw blade reciprocates vertically in response to up and down movement of said upper and lower pivotable arms; said saw having upper and lower linear extending bearings surrounding said upper and lower blade carriers to insure said saw blade travels in a vertical motion to reduce workpiece chatter;
   c) a horizontal work table mounted on said upright frame and supported by said base upon which a workpiece can be placed;
   d) an upper frame arm having said upper pivotable arm extending therefrom across said work table;
   e) an upper blade carrier mounted on a free end of said upper frame arm for supporting an upper end of said saw blade, and a lower blade clamp attached to a free end of said lower pivotable arm for clamping a lower end of said saw blade;
   f) an adjustable work hold-down device mounted on said upper frame arm adjacent said upper blade carrier; and
   g) a rotatable member disposed in said upright frame to permit said upper frame assembly and said upper pivotable arm to rotate in a horizontal plane to allow the upper pivotable arm and said upper frame assembly to rotate to a side and clear said work table to allow a user to lace a workpiece onto said saw blade.

2. The scroll saw of claim 1, wherein said rotatable member further comprises a turntable bearing.

3. The scroll saw of claim 1, wherein a front portion of said work table is separatable and removable from said scroll saw to permit said saw blade to be accessed.

4. The scroll saw of claim 3, further comprising a pair of arms disposed underneath said work table for supporting said work table on said scroll saw, wherein said front portion of said work table can be removed from said scroll saw by unscrewing a single hand knob for allowing said front portion of said work table to be slidingly removed on said pair of arms.

5. The scroll saw of claim 1, further comprising a work table leveling device disposed on a rear end of said work table to permit said work table to be leveled.

6. The scroll saw of claim 5, wherein said work table leveling device further comprises a pivoting member of predetermined length extending upwardly from a frame spacer for leveling said work table, wherein said work table leveling device pivots between a first vertical position and a second angled position.

7. The scroll saw of claim 1, further comprising an upper link above said upper linear bearing for connecting said upper end of said saw blade to said upper pivotable arm and a lower link for connecting said lower end of said saw blade to said lower pivotable arm.

8. The scroll saw of claim 1, wherein said saw blade position remains centered in an upper saw blade carrier during operation to prevent said saw blade from creeping forward during operation.

9. The scroll saw of claim 7, wherein said upper saw blade carrier has a slot therein, wherein said slot includes an approximate three-degree relief angle to prevent said saw blade from creeping forward during operation.

10. A method for assembling and operating a scroll saw, comprising the steps of:
    a) providing a base having an upright frame mounted on the base and extending upwardly for supporting a work table, mounting upper and lower pivotable arms on the upright frame, and a motor for driving both said upper and lower pivotable arms;
    b) attaching a saw blade having upper and lower ends to the upper and lower pivotable arms, wherein the saw blade reciprocates vertically in response to up and down movement of the upper and lower pivotable arms; said saw having upper and lower linear extending bearings surrounding said upper and lower blade carriers to insure said saw blade travels in a vertical motion to reduce workpiece chatter;
    c) mounting the work table horizontally on the upright frame and supporting it on the base upon which a workpiece can be placed;

d) providing an upper frame arm with the upper pivotable arm extending from the upright frame arm across the work table;

e) mounting an upper blade carrier on a free end of said upper frame arm for supporting an upper end of said saw blade, and attaching a lower blade clamp to a free end of said lower pivotable arm for clamping a lower end of said saw blade;

f) mounting an adjustable work hold-down device on said upper frame arm adjacent said upper blade carrier; and g) using a rotatable member in the upright frame to rotate the upper frame assembly and said upper pivotable arm in a horizontal plane to allow the upper pivotable arm to rotate to a side and clear said work table to allow a user to place a workpiece onto said saw blade.

11. The method of claim 10, wherein the rotatable member further comprises a turntable bearing.

12. The method of claim 10, wherein a front portion of the work table can be separated and removed from the scroll saw to permit the saw blade to be accessed.

13. The method of claim 12, further comprising the step of providing a pair of arms disposed underneath the work table for supporting the work table on said scroll saw, wherein the front portion of the work table can be removed by unscrewing a single hand knob from the scroll saw allowing the front portion of the work table to be slidingly removed on the pair of arms.

14. The method of claim 10, further comprising the step of providing a work table leveling device disposed on a rear end of the work table to permit the work table to be leveled.

15. The method of claim 14, wherein the work table leveling device further comprises a pivoting member of predetermined length extending upwardly from a frame spacer for leveling the work table, wherein the work table leveling device pivots between a first vertical position and a second angled position.

16. The method of claim 10, further comprising the step of providing an upper link above said upper linear bearing for connecting the upper end of the saw blade to the upper pivotable arm, and a lower link for connecting the lower end of the saw blade to the lower pivotable arm.

17. The method of claim 10, wherein the saw blade position remains centered in an upper saw blade carrier during operation to prevent the saw blade from creeping forward during operation.

18. The method of claim 17, wherein the upper saw blade carrier has a slot therein, wherein the slot includes an approximate three-degree relief angle to prevent the saw blade from creeping forward during operation.

\* \* \* \* \*